(12) United States Patent
Kanaya et al.

(10) Patent No.: US 8,191,876 B2
(45) Date of Patent: Jun. 5, 2012

(54) FLUID FILLED TYPE VIBRATION DAMPING DEVICE

(75) Inventors: Tomohiro Kanaya, Kasugai (JP);
Masaaki Hamada, Konan (JP);
Masahiro Ohnishi, Niwa-gun (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 93 days.

(21) Appl. No.: 12/733,554

(22) PCT Filed: Jul. 29, 2009

(86) PCT No.: PCT/JP2009/003592
§ 371 (c)(1),
(2), (4) Date: Mar. 8, 2010

(87) PCT Pub. No.: WO2010/013465
PCT Pub. Date: Feb. 4, 2010

(65) Prior Publication Data
US 2011/0001281 A1    Jan. 6, 2011

(30) Foreign Application Priority Data

Aug. 1, 2008 (JP) .................................. 2008-200173
Jan. 30, 2009 (JP) .................................. 2009-019267

(51) Int. Cl.
F16F 5/00 (2006.01)
F16F 9/10 (2006.01)
F16M 5/00 (2006.01)

(52) U.S. Cl. .................................. 267/140.13; 267/219

(58) Field of Classification Search ................ 267/64.11, 267/64.13, 64.27, 140.11, 140.12, 140.13, 267/140.14, 140.15, 35, 219, 220; 248/562, 248/563, 565, 566, 636
See application file for complete search history.

(56) References Cited

U.S. PATENT DOCUMENTS 4,572,490 A * 2/1986 Alciati ................ 267/140.11
4,630,803 A * 12/1986 Werner et al. .......... 267/140.11
4,632,370 A * 12/1986 Ticks et al. ............ 267/140.13
(Continued)

FOREIGN PATENT DOCUMENTS
JP     62278334 A  * 12/1987
(Continued)

OTHER PUBLICATIONS

International Search Report issued in International Application No. PCT/JP2009/003592 by the International Bureau on Sep. 15, 2009 (with English language translation).

(Continued)

Primary Examiner — Thomas J Williams
(74) Attorney, Agent, or Firm — Oliff & Berridge, PLC

(57) ABSTRACT

A fluid-filled type vibration damping device wherein a second mounting member is secured to a vehicle body; an opening of the second mounting member is closed off to define a pressure-receiving chamber a flexible film is arranged covering an outside of a main rubber elastic body to define an equilibrium chamber; a low-frequency orifice passage and a high-frequency orifice passage connect the pressure-receiving chamber and the equilibrium chamber a first moveable member is disposed on a fluid channel through the high-frequency orifice passage; the first moveable member being supported by a first support member that is linked to the second mounting member via the main rubber elastic body; and a fluid channel through the low-frequency orifice passage is situated away from the placement location of the first moveable member.

16 Claims, 10 Drawing Sheets

U.S. PATENT DOCUMENTS

| | | | |
|---|---|---|---|
| 4,750,719 A * | 6/1988 | Hartel | 267/140.13 |
| 4,834,348 A * | 5/1989 | Jordens et al. | 267/140.13 |
| 5,085,413 A * | 2/1992 | Freudenberg et al. | 267/140.13 |
| 5,927,698 A * | 7/1999 | Miyoshi et al. | 267/140.13 |
| 6,068,246 A * | 5/2000 | Lee et al. | 267/140.11 |
| 6,341,766 B1 * | 1/2002 | Stiller et al. | 267/140.13 |
| 6,863,269 B2 * | 3/2005 | Okumura et al. | 267/140.13 |
| 7,007,934 B2 * | 3/2006 | Goto et al. | 267/140.13 |
| 7,128,311 B2 * | 10/2006 | Goto et al. | 267/140.14 |
| 2006/0220289 A1 | 10/2006 | Okumura et al. | |
| 2007/0046406 A1 | 3/2007 | Matsuoka et al. | |
| 2008/0136074 A1 | 6/2008 | Nemoto | |

FOREIGN PATENT DOCUMENTS

| | | |
|---|---|---|
| JP | A-1-193425 | 8/1989 |
| JP | U-2-103542 | 8/1990 |
| JP | A-2004-218753 | 8/2004 |
| JP | A-2006-144817 | 6/2006 |
| JP | A-2006-275272 | 10/2006 |
| JP | A-2007-64316 | 3/2007 |
| JP | A-2008-128352 | 6/2008 |

OTHER PUBLICATIONS

Chinese Office Action issued in Chinese Application No. 200980103680.7 dated Feb. 3, 2012 (w/ English Translation).

* cited by examiner

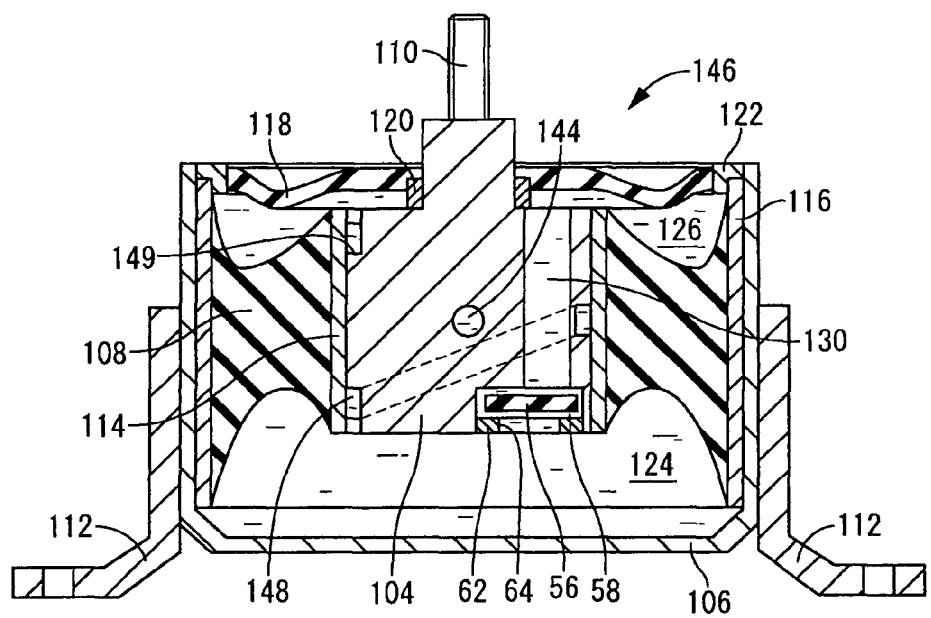
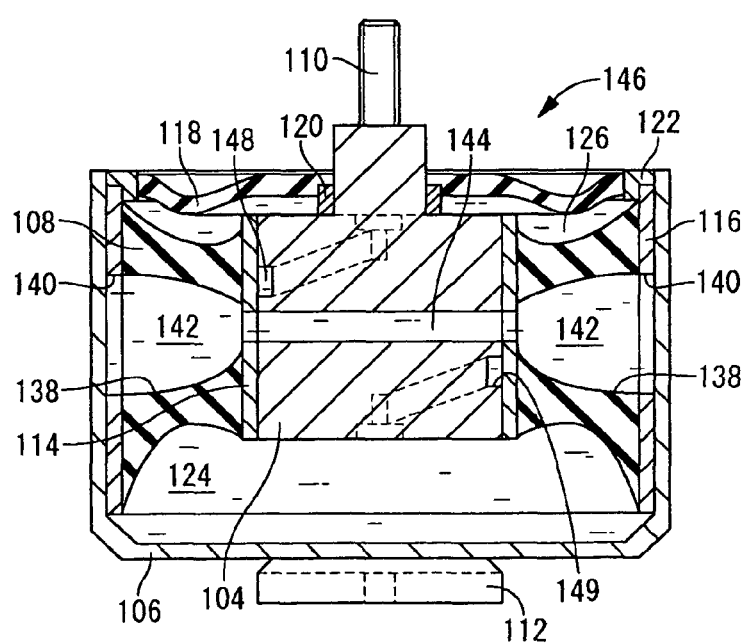

FLUID FILLED TYPE VIBRATION DAMPING DEVICE

TECHNICAL FIELD

The present invention pertains to a vibration damping device suitable for applications such as an automotive engine mount or the like, and relates in particular to a fluid-filled type vibration damping device adapted to produce vibration damping action utilizing flow action of a non-compressible fluid sealed inside.

BACKGROUND ART

Fluid-filled type vibration damping devices suitable for example in engine mount applications to provide vibration damped support of the power unit on the vehicle body of an automobile have been proposed in the past. Such fluid-filled type vibration damping devices have a construction in which a first mounting fitting mounted onto a primary vibration system and a second mounting fitting mounted onto the vehicle body are linked to one another by a main rubber elastic body. One known type of such vibration damping device has a pressure-receiving chamber whose wall is partially defined by the main rubber elastic body and that is adapted to give rise to internal pressure fluctuations at times of vibration input, and an equilibrium chamber whose wall is partially defined by a diaphragm and that permits change in volume through deformation of the diaphragm; in this fluid-filled type vibration damping device, the pressure-receiving chamber and the equilibrium chamber are filled with a non-compressible fluid, and an orifice passage is formed connecting the pressure-receiving chamber and the equilibrium chamber with one another. At times of vibration input, this fluid-filled type vibration damping device exhibits vibration damping action based on resonance action etc. of fluid flowing through the orifice passage between the pressure-receiving chamber and the equilibrium chamber. Once such device is disclosed in Patent Citation 1.

However, a problem with fluid-filled type vibration damping devices is that while they have excellent vibration damping action based on fluid flow action against vibration of the frequency to which the orifice passage has been pre-tuned, it is difficult to attain effective vibration damping action of vibration lying outside the tuning frequency. Particularly at times of input of vibration having higher frequency than the tuning frequency of the orifice passage, because the orifice passage becomes clogged and substantially blocked off due to antiresonance, the problem of markedly diminished vibration damping capability due to a higher dynamic spring rate of the mount as a whole tends to occur.

As taught in Patent Citation 1, it has been attempted provide both a low-frequency orifice passage tuned for example to the low-frequency range of engine shake, as well as a high-frequency orifice passage tuned for example to the high frequency range of idling vibration, in order to achieve a vibration damping device capable of producing effective vibration damping action of any of multiple types of vibration of different frequency.

In such a vibration damping device furnished with multiple orifice passages, in order for the low-frequency orifice passage to have efficient high-attenuating action, the high-frequency orifice passage is designed to become blocked at times of input of vibration in the low-frequency range to which the low-frequency orifice passage has been tuned. Specifically, as taught in Patent Citation 1, on the channel of the high-frequency orifice passage there is disposed a moveable plate which is allowed to undergo displacement in the plate thickness direction, as well as a support member adapted to limit the level of displacement of the moveable plate in the plate thickness direction; and at times of input of low-frequency, large-amplitude vibration, the moveable plate is constrained by the support member so that the high-frequency orifice passage is blocked. Meanwhile, at times of input of high-frequency, small-amplitude vibration to which the high-frequency orifice passage has been tuned, fluid flow is effectively produced through the high-frequency orifice passage by minute displacements of the moveable plate.

However, even the fluid-filled type vibration damping device disclosed in Patent Citation 1 has an unresolved issue. Specifically, in the fluid-filled type vibration damping device according to Patent Citation 1, the pressure-receiving chamber and the equilibrium chamber are formed in series in the direction of the center axis to the inside peripheral side of the second mounting fitting which has circular cylinder shape; and a partition member is disposed between the pressure-receiving chamber and the equilibrium chamber, and is supported by the second mounting fitting. An orifice passage is formed in this partition member, and the moveable plate which has been arranged on the fluid channel of the high-frequency orifice passage is supported by the partition member. For this reason, the fluid-filled type vibration damping device tends to have a larger dimension in the axial direction, thus requiring a larger installation space and hampering attempts to reduce vehicle size.

Moreover, for reasons such as avoiding reduced durability of the diaphragm due to heat emitted from the engine, or avoiding pressure fluctuations arising from temperature changes in the air chamber formed between the bracket and the diaphragm, the second mounting fitting which supports the partition member is designed to be mounted on the vehicle body. Thus, when the moveable plate strikes against the partition member due to input of low-frequency, large-amplitude vibration, noise and vibration produced by this striking will be transmitted without attenuation from the second mounting fitting to the vehicle body. As a result, passengers inside the cabin may feel noise and vibration.

Prior Art Document

Patent Citation

Patent Citation 1: JP-A 1-193425

SUMMARY OF THE INVENTION

Problem the Invention Attempts to Solve

With the foregoing in view, an object of the present invention is to provide a fluid-filled type vibration damping device of compact size and novel construction adapted to produce effective vibration damping action of any of several kinds of vibration of different frequency through switching of the orifice passage by a moveable member, while preventing noise and vibration produced by striking of the moveable member from being transmitted to the vehicle body.

Means for Solving the Problem

The above objects of this invention may be attained according to the following modes of the invention. The elements employed in each of the mode of the invention described hereinbelow may be adopted in any possible optional combination. It is to be understood that the modes and the principle of the invention are not limited to the disclosure herein, but may otherwise be recognized based on the teachings of the present invention disclosed in the entire specification and drawings, or recognized by those skilled in the art in the light of the present disclosure.

Specifically, the present invention provides a fluid-filled type vibration damping device wherein a first mounting member is positioned spaced apart from a first opening of the cylindrical portion of a second mounting member having a cylindrical portion, with the first mounting member and the second mounting member being linked by a main rubber elastic body, and a pressure-receiving chamber whose wall is partially defined by the main rubber elastic body and filled with a non-compressible fluid and an equilibrium chamber whose wall is partially defined by a flexible film and filled with the non-compressible fluid are provided such that the pressure-receiving chamber and the equilibrium chamber are connected through an orifice passage, the fluid-filled type vibration damping device being characterized in that: the first mounting member is secured to a primary vibration system while the second mounting member is secured to a vehicle body; an other opening of the cylindrical portion of the second mounting member is closed off by a cover member to define the pressure-receiving chamber between opposing faces of the cover member and the main rubber elastic body; a flexible film is arranged covering an outside of the main rubber elastic body to define the equilibrium chamber to an opposite side of the main rubber elastic body from the pressure-receiving chamber; a low-frequency orifice passage and a high-frequency orifice passage which are tuned to mutually different frequency ranges are provided as the orifice passage; a first moveable member adapted to limit a level of fluid flow is disposed on a fluid channel through the high-frequency orifice passage, with the first moveable member being supported by a first support member that is elastically linked to the second mounting member via the main rubber elastic body; and a fluid channel through the low-frequency orifice passage is situated away from the placement location of the first moveable member.

In the fluid-filled type vibration damping device constructed according to the present invention, both a low-frequency orifice passage and a high-frequency orifice passage are provided, whereby effective vibration damping action can be achieved against vibration of either of the frequencies to which the low-frequency orifice passage and the high-frequency orifice passage have been tuned. It is therefore possible to achieve excellent vibration damping capabilities where implemented in an engine mount or similar system experiencing input of several types of vibration of different frequencies.

Moreover, the first moveable member is disposed on the fluid channel through the high-frequency orifice passage for limiting the level of fluid flow through the high-frequency orifice passage according to the frequency of input vibration. Therefore, upon input of vibration in the frequency range to which the low-frequency orifice passage has been tuned, the level of fluid flow through the low-frequency orifice passage can be advantageously assured so as to efficiently produce the intended vibration damping effect.

In the fluid-filled type vibration damping device constructed according to the present invention, the first support member which supports the first moveable member is linked to the second mounting member via the main rubber elastic body. In other words, the main rubber elastic body is situated on the path over which energy exerted on the first support member through contact between the first moveable member and the first support member is transmitted to the vehicle body side. For this reason, energy arising through contact between the first moveable member and the first support member will be attenuated through energy loss on the basis of factors such as internal friction of the main rubber elastic body, thereby reducing or preventing noise and vibration from occurring in the vehicle body due to this energy.

Moreover, by disposing a flexible film to the outside of the main rubber elastic body to define the equilibrium chamber, the equilibrium chamber can be provided with good space efficiency, allowing the fluid-filled type vibration damping device to be smaller in the axial direction.

Further, in the fluid-filled type vibration damping device constructed according to the present invention, the high-frequency orifice passage can be provided in the first mounting member, and the first support member can be constituted by the first mounting member.

By ensuring space for forming the high-frequency orifice passage in the first mounting member in this way, it becomes easy to attain the short passage length and large passage cross-sectional area required of the high-frequency orifice passage. Also, because the first support member for supporting the first moveable member is constituted by the first mounting member, adequate free length of the section in the main rubber elastic body linking the first support member and the second mounting member can be efficiently assured. For this reason, energy arising through contact between the first moveable member and the first support member will be attenuated more effectively by the main rubber elastic body, which has been disposed on the transmission path from the first support member to the vehicle body side, thus more advantageously preventing noise and vibration from occurring in the vehicle body side.

In the fluid-filled type vibration damping device constructed according to the present invention, the high-frequency orifice passage may be provided as a passage of tunnel form passing through an interior of the first mounting member and communicating at one end with the pressure-receiving chamber while communicating at the other end with the equilibrium chamber, with the first moveable member situated accommodated on the high-frequency orifice passage so as to be oriented orthogonal to a lengthwise direction of the channel. By adopting such a construction, the high-frequency orifice passage and the first moveable member may be furnished with simpler construction and smaller space requirements, reducing the number of parts in manufacture.

In another possible construction that may be employed in the fluid-filled type vibration damping device constructed according to the present invention, wherein a medial support member is attached to the main rubber elastic body in a medial section thereof in a direction of linking the first mounting member and the second mounting member such that the medial support member extends so as to encircle an outer perimeter of the first mounting member; the first moveable member is supported by the medial support member; a middle chamber filled with a non-compressible fluid is formed between the first moveable member and the first mounting member; the pressure-receiving chamber is formed between the first moveable member and the cover member; and the pressure-receiving chamber and the equilibrium chamber communicate by the high-frequency orifice passage via the middle chamber.

By employing such a construction in which the first moveable member is supported by the medial support member, the occurrence of noise and vibration caused by contact of the first moveable member and the medial support member can be reduced or prevented by the main rubber elastic body which has been interposed between the medial support member and the second mounting member. Additionally, because the high-frequency orifice passage connects the pressure-receiving chamber and the equilibrium chamber via the middle chamber, vibration damping action based on flow action of fluid in the high-frequency orifice passage can be produced effectively. Further, through switching of the high-frequency orifice passage between the communicating and blocked states by the first moveable member which partially defines the wall of the middle chamber and which has been disposed on the fluid channel of the high-frequency orifice passage, vibration damping action on the part of the low-frequency orifice passage and vibration damping action on the part of the high-frequency orifice passage can both be achieved efficiently.

In the present embodiment, the first moveable member is disposed between the middle chamber and the pressure-receiving chamber, and the middle chamber defines a part of the fluid channel that leads through the high-frequency orifice passage which connects the pressure-receiving chamber with the equilibrium chamber. Thus, the first moveable member is disposed on the fluid channel through the high-frequency orifice passage.

In the fluid-filled type vibration damping device constructed according to the present invention, preferably, the low-frequency orifice passage is formed by a construction that extends in a circumferential direction along the cylindrical portion of the second mounting member.

By ensuring space to form the low-frequency orifice passage so that it may extend in the circumferential direction along the cylindrical portion of the second mounting member in this way, sufficient passage length of the low-frequency orifice passage can be efficiently assured, and the low-frequency orifice passage can be formed with an excellent degree of freedom in tuning. In particular, the longer passage length necessary for tuning to a low-frequency range can be assured, while avoiding increased size of the fluid-filled type vibration damping device as a whole so that the fluid-filled type vibration damping device of the present invention can be realized with compact size.

In yet another possible construction that can be employed in the fluid-filled type vibration damping device constructed according to the present invention, at least a portion of the first mounting member is constituted as an insertion portion adapted to be inserted into the cylindrical portion of the second mounting member, with the insertion portion of the first mounting member and the cylindrical portion of the second mounting member being linked by the main rubber elastic body; a plurality of fluid chambers are formed in the main rubber elastic body to either side of the insertion portion of the first mounting member in the axis-perpendicular direction of the cylindrical portion; and a first connecting passage is formed connecting these fluid chambers to one another.

With this arrangement, upon input of vibration in the axis-perpendicular direction, fluid flow will arise through the first connecting passage due to relative pressure fluctuations between the fluid chambers, and vibration damping action will be produced on the basis of flow action of the fluid. For this reason, both vibration damping action against vibration input in the axial direction and vibration damping action against vibration input in the axis-perpendicular direction can be achieved, so that further improvements in vibration damping capability can be attained.

Where such a first connecting passage is employed, there may be employed a construction wherein the insertion portion of the first mounting member has large-diameter circular post shape; two axial direction through-holes of mutually different diameter are provided passing in the axial direction through the insertion portion, with the small-diameter axial direction through-hole constituting the low-frequency orifice passage and the large-diameter axial direction through-hole constituting the high-frequency orifice passage; and an additional axis-perpendicular direction through-hole is provided passing through the insertion portion in the axis-perpendicular direction in a zone thereof away from the two axial direction through-holes, with the axis-perpendicular direction through-hole constituting the first connecting passage. With this arrangement, the low-frequency orifice passage, the high-frequency orifice passage, and the first connecting passage can be provided with minimal space requirements to achieve a fluid-filled type vibration damping device of smaller size.

Alternatively, where the first connecting passage discussed above is employed, there may be employed a construction wherein the insertion portion of the first mounting member has large-diameter circular post shape; the low-frequency orifice passage is constituted by a tunnel-like passage that extends in the circumferential direction while sloping in the axial direction through the outside peripheral section of the insertion portion; the high-frequency orifice passage is constituted by an axial direction through-hole passing in the axial direction through the insertion portion; and the first connecting passage is constituted by an axis-perpendicular direction through-hole passing through the insertion portion in the axis-perpendicular direction in a zone thereof away from these orifice passages. With such a construction as well, the low-frequency orifice passage, the high-frequency orifice passage, and the first connecting passage can be provided with minimal space requirements to achieve a fluid-filled type vibration damping device of smaller size. Moreover, it will be possible to design the low-frequency orifice passage with a higher degree of freedom in tuning.

In an additional possible arrangement in a fluid-filled type vibration damping device constructed having such a first connecting passage, the first connecting passage includes a low-frequency first connecting passage and a high-frequency first connecting passage that is tuned to a higher frequency range than the low-frequency first connecting passage; a second moveable member adapted to limit the level of fluid flow through the high-frequency first connecting passage is disposed on a fluid channel of the high-frequency first connecting passage; and the second moveable member is supported by a second support member that is elastically linked to the second mounting member by the main rubber elastic body.

By thusly providing as the first connecting passage one that includes a low-frequency first connecting passage and a high-frequency first connecting passage that have been tuned to mutually different frequencies, effective vibration damping action can be produced against multiple types of vibration of different frequency. Additionally, upon input of low-frequency vibration to which the low-frequency first connecting passage has been tuned, the level of fluid flow through the high-frequency first connecting passage will be limited by the second moveable member which has been disposed on the fluid channel of the high-frequency first connecting passage. For this reason, at times of input of low-frequency vibration, sufficient levels of fluid flow through the low-frequency first connecting passage will be efficiently assured, and vibration damping action based on flow action of fluid in the low-frequency first connecting passage will be effectively produced. Moreover, the second moveable member is supported by a second support member that is elastically linked to the second mounting member by the main rubber elastic body. For this reason, colliding force arising from contact between the second moveable member and the second support portion will be reduced by virtue of the main rubber elastic body which has been disposed on the path of transmission to the second mounting member. As a result, noise and vibration occurring due to force of contact of the second moveable member and the second support member can be prevented from being transmitted to the vehicle body side, which is the side on which the second mounting member is mounted.

Where the high-frequency orifice passage has been formed in the first mounting member, the second support member may be constituted by the first mounting member. Also, in a construction having a second connecting passage that connects a fluid chamber and the equilibrium chamber, and a first connecting passage connecting the fluid chambers to one another, either the first connecting passage or the second connecting passage may serve as the low-frequency connecting passage, with the other serving as the high-frequency connecting passage.

In yet another possible arrangement for the fluid-filled type vibration damping device according to the present invention constructed having a first connecting passage, the first connecting passage includes a low-frequency first connecting passage and a high-frequency first connecting passage that is tuned to a higher frequency range than the low-frequency first connecting passage; a second moveable member adapted to limit the level of fluid flow through the high-frequency first connecting passage is disposed on the fluid channel of the high-frequency first connecting passage; the second moveable member is supported by a second support member that is elastically linked to the second mounting member by the main rubber elastic body; the insertion portion of the first mounting member has large-diameter circular post shape with two axial direction through-holes of mutually different diameter provided passing in the axial direction through the insertion portion, the small-diameter axial direction through-hole constituting the low-frequency orifice passage and the large-diameter axial direction through-hole constituting the high-frequency orifice passage; two axis-perpendicular direction through-holes of mutually different diameter are provided passing through the insertion portion in the axis-perpendicular direction in a zone thereof away from the two axial direction through-holes, with the small-diameter axis-perpendicular direction through-hole constituting a low-frequency first connecting passage, and the large-diameter axis-perpendicular direction through-hole constituting a high-frequency first connecting passage. With this arrangement, the orifice passages and the first connecting passages will require less space so the fluid-filled type vibration damping device may have smaller size, and additionally, vibration damping capabilities with respect to input vibration in the axis-perpendicular direction can be improved.

In yet another possible arrangement for the fluid-filled type vibration damping device according to the present invention, the first connecting passage is formed in a zone away from the low-frequency orifice passage and the high-frequency orifice passage in the first mounting member.

With this arrangement, by forming the first connecting passage in the first mounting member, there is no need to provide a special member for forming the connecting passage, so a fluid-filled type vibration damping device furnished with a connecting passage can be provided with fewer parts and simpler construction. Moreover, by forming the first connecting passage in a zone away from the low-frequency orifice passage and the high-frequency orifice passage, the first connecting passage can be formed independently from the low-frequency orifice passage and the high-frequency orifice passage, and vibration damping capability in the axis-perpendicular direction can be improved without adverse effects on vibration damping characteristics in the axial direction.

Alternatively, in another possible arrangement for the fluid-filled type vibration damping device constructed according to the present invention, at least a portion of the first mounting member is constituted as an insertion portion adapted to be inserted into the cylindrical portion of the second mounting member, with the insertion portion of the first mounting member and the cylindrical portion of the second mounting member being linked by the main rubber elastic body; at least one fluid chamber is formed in the main rubber elastic body between the opposing faces of the insertion portion and the cylindrical portion; and a second connecting passage is formed connecting the fluid chamber to the equilibrium chamber.

With this mode as well, at times of input of vibration in the axis-perpendicular direction, vibration damping action based on flow action of fluid will be produced by fluid flow through the second connecting passage arising because of relative pressure fluctuations between the fluid chamber and the equilibrium chamber. Moreover, because the second connecting passage has been formed so as to connect the fluid chamber with an equilibrium chamber having low wall spring rigidity, fluid flow through the second connecting passage can be produced more efficiently so as to more effectively achieve the desired vibration damping action. Furthermore, by utilizing an equilibrium chamber that communicates with the low-frequency orifice passage and the high-frequency orifice passage as the equilibrium chamber connected to the fluid chamber by the second connecting passage, it is possible to avoid increased size of the fluid-filled type vibration damping device.

In another possible arrangement for the fluid-filled type vibration damping device having the construction described above, a plurality of fluid chambers are formed to either side of the insertion portion of the first mounting member in the axis-perpendicular direction; the fluid chambers are respectively connected to the equilibrium chamber by a second connecting passage; and a first connecting passage is formed connecting the plurality of fluid chambers to one another.

By thusly providing a first connecting passage for interconnecting the fluid chambers in addition to second connecting passages connecting the fluid chambers with the equilibrium chamber, vibration damping capability against vibration input in the axis-perpendicular direction can be improved further. The first connecting passage and the second connecting passages may be tuned to the same frequency, but preferably will be tuned to mutually different frequencies so as to afford effective vibration damping action against several types of vibration of different frequencies.

In yet another possible arrangement for the fluid-filled type vibration damping device according to the present invention constructed having second connecting passages, an orifice fitting is attached fitting diametrically between the second mounting member and an outside peripheral mating attachment fitting that has been vulcanization bonded to the outside peripheral face of the main rubber elastic body; the orifice fitting is furnished with a first circumferential groove that opens onto the outside peripheral face thereof and that extends in a helical pattern in the circumferential direction while sloping in the axial direction to connect the pressure-receiving chamber and the equilibrium chamber, and with a second circumferential groove that extends in the circumferential direction for a length approximately half the circumference and connects a pair of fluid chambers; the openings of the first and second circumferential grooves are covered by the second mounting member, whereby a low-frequency orifice passage is constituted by the first circumferential groove constitutes and a first connecting passage is constituted by the second circumferential groove; the insertion portion of the first mounting member has large-diameter circular post shape; a high-frequency orifice passage is constituted by an axial direction through-hole that passes in the axial direction through the insertion portion; and a pair of second connecting passages are constituted by a pair of through-holes that pass through the insertion portion in a zone away from the high-frequency orifice passage and that respectively connect the pair of fluid chambers with the equilibrium chamber. According to this mode, the orifice passages and the first and second connecting passage can be provided with minimal space requirements to achieve a fluid-filled type vibration damping device of smaller size.

In another possible arrangement for the fluid-filled type vibration damping device with such a construction, the second connecting passage is formed in a zone of the first mounting member away from the low-frequency orifice passage and the high-frequency orifice passage.

With this arrangement, by forming the second connecting passage in the first mounting member, there is no need to provide a special member for forming the connecting passage, so a fluid-filled type vibration damping device furnished with connecting passages can be provided with fewer parts and simpler construction. Moreover, by forming the second connecting passage in a zone away from the low-frequency orifice passage and the high-frequency orifice passage, the second connecting passage can be formed independently from the low-frequency orifice passage and the high-frequency orifice passage, and vibration damping capability in the axis-perpendicular direction can be improved without adverse effects on vibration damping characteristics in the axial direction.

The fluid-filled type vibration damping device according to the present invention may be applied as an engine mount wherein the primary vibration system is a power unit. By employing the fluid-filled type vibration damping device constructed according to the present invention as an engine mount, where the second mounting member which supports the diaphragm has been mounted on the vehicle body side with the goal of avoiding reduced durability of the diaphragm due to heat emitted from the engine which constitutes the power unit for example, striking noise produced by striking of the first moveable member can be prevented from being transmitted to the vehicle body side.

Effect of the Invention

According to the present invention, the first support member which supports the first moveable member adapted to carry out switching of the orifice passage is linked to the second mounting member via the main rubber elastic body, thereby reducing transmission of noise and vibration caused by striking of the moveable member.

BRIEF DESCRIPTION OF THE DRAWINGS

FIG. 8 is a vertical cross sectional view of an automotive engine mount according to a fifth embodiment of the present invention.

FIG. 9 is another vertical cross sectional view of the engine mount.

EMBODIMENTS FOR CARRYING OUT THE INVENTION

A fuller understanding of the present invention is provided by the following detailed description of the embodiments with reference to the accompanying drawings.

Figure 1:
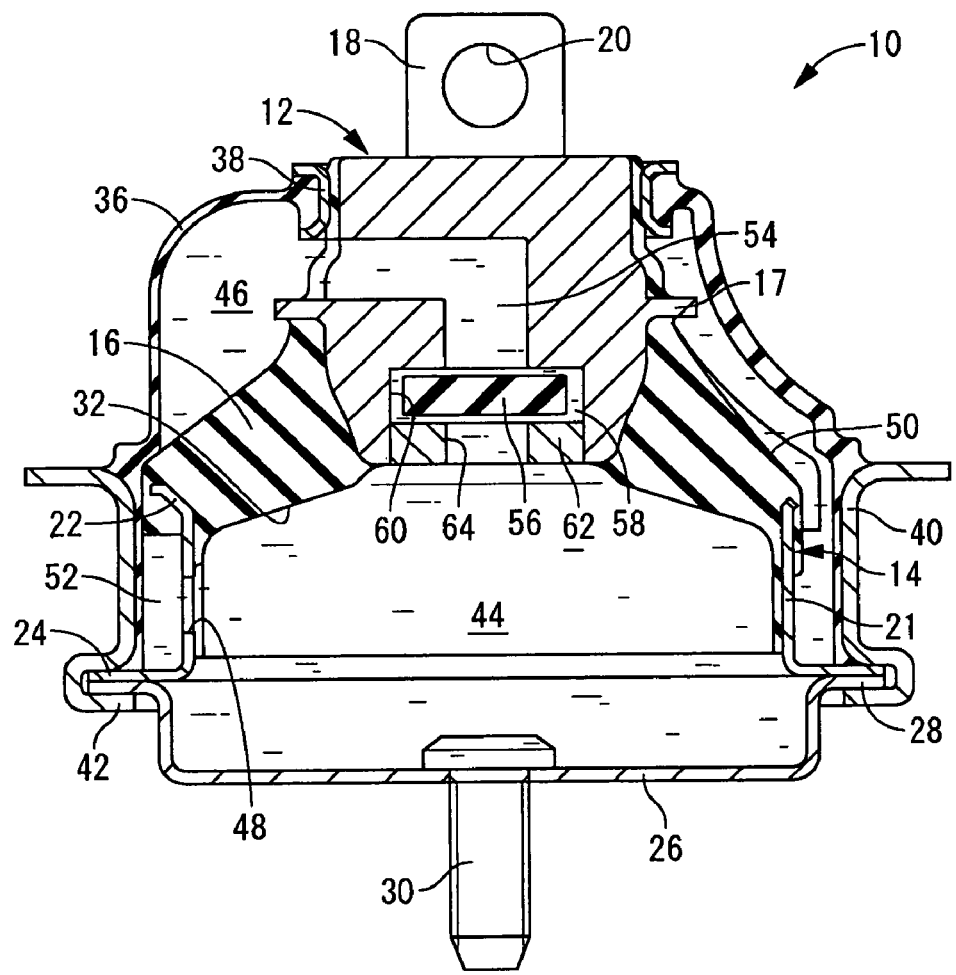
FIG. 1 is a vertical cross sectional view of an automotive engine mount according to a first embodiment of the present invention.

First, FIG. 1 depicts an automotive engine mount 10 described as a first embodiment of the fluid-filled type vibration damping device constructed according to the present invention. The engine mount 10 has a construction in which a first mounting member 12 of metal and a second mounting member 14 of metal are linked to one another by a main rubber elastic body 16. The first mounting member 12 is mounted onto a power unit which is the primary vibration system, while the second mounting member 14 is mounted onto the vehicle body so as to provide the power unit with vibration-damped support on the vehicle body. In the following description, as a general rule, the vertical direction refers to the vertical direction in FIG. 1. FIG. 1 depicts the engine mount 10 prior to installation in a vehicle; when installed in a vehicle, the distributed load of the power unit will be exerted in the vertical direction, causing the first mounting member 12 and the second mounting member 14 to experience displacement closer together in the axial direction.

To describe in greater detail, the first mounting member 12 is a rigid member made of metal or rigid synthetic resin, and has approximately circular post shape. In the approximately center section in the axial direction of the first mounting member 12 there is integrally formed a flange portion 17 of annular form extending towards the outside peripheral side. A mounting portion 18 of plate shape is integrally formed on the first mounting member 12 and projects upward from its upper end face; the first mounting member 12 is designed to be secured to the power unit side by a mounting bolt (not shown) slipped through a bolt hole 20 that passes in the plate thickness direction through the mounting portion 18, and screwed to a component to the power unit side.

Meanwhile, like the first mounting member 12, the second mounting member 14 is a rigid member and is furnished with a cylindrical portion 21 having thin-walled, large-diameter, approximately circular cylinder shape. A tapered tube portion 22 that flares out towards the top is provided at the upper end part of the cylindrical portion 21 of the second mounting member 14, while a flanged support portion 24 extending towards the outside peripheral side is integrally formed in the lower end part.

A cover member 26 is juxtaposed from below against and secured to the second mounting member 14. The cover member 26 is a high-rigidity member of large-diameter, approximately dish shape with a clasped portion 28 of flange form integrally formed at the edge of the opening and designed to be secured juxtaposed against the support portion 24 of the second mounting member 14. The base wall portion of the cover member 26 is perforated in the axial direction by a mounting bolt 30 situated at the diametrical center allowing the second mounting member 14 to be secured to the vehicle body side through the agency of the cover member 26 by threading the mounting bolt 30 into a component on the vehicle body side.

The first mounting member 12 is positioned coaxially with the second mounting member 14 and spaced apart to the upper side therefrom, with the first mounting member 12 and the second mounting member 14 linked by the main rubber elastic body 16. The main rubber elastic body 16 is a rubber elastic body having approximately truncated conical shape into whose upper end, which is also its small-diameter end, the first mounting member 12 has been inserted and vulcanization bonded; and whose lower end, which is also its large-diameter end, has been vulcanization bonded at the outside peripheral face thereof to the upper end part of the second mounting member 14 inclusive of the tapered tube portion 22. In the present embodiment, the main rubber elastic body 16 takes the form of an integrally vulcanization molded component incorporating the first and second mounting members 12, 14. Also, in the present embodiment, elastic deformation of the main rubber elastic body 16 at times of vibration input in the axial direction is advantageously produced by the flange portion 17 which has been provided to the first mounting member 12 and the tapered tube portion 22 which has been provided to the second mounting member 14, thus efficiently giving rise to internal pressure fluctuations in a pressure-receiving chamber 44, discussed later.

A large-diameter recess 32 of inverted, approximately bowl shape open at the bottom is formed in the main rubber elastic body 16. Additionally, a seal rubber layer extending out towards the bottom from the rim of the mouth of the large-diameter recess 32 has been integrally formed with the main rubber elastic body 16 and is anchored covering the inside peripheral face of the second mounting member 14.

A flexible film 36 is disposed to the outside peripheral side of the main rubber elastic body 16. The flexible film 36 is formed by a thin rubber film, and has approximately annular shape extending in the circumferential direction with a curved cross-sectional profile having ample slack to allow it to readily undergo elastic deformation.

An inside peripheral mating attachment fitting 38 is vulcanization bonded to the inside peripheral edge part of the flexible film 36. The inside peripheral mating attachment fitting 38 is a rigid member made of metal or the like, and on the whole is ring-shaped. An outside peripheral caulking fitting 40 has been vulcanization bonded to the outside peripheral edge part of the flexible film 36. The outside peripheral caulking fitting 40 has large-diameter, approximately circular cylinder shape with a caulking piece 42 integrally formed all the way around the circumference at the lower end. The inside peripheral face of the flexible film 36 has been juxtaposed against and vulcanization bonded to the outside peripheral face of the inside peripheral mating attachment fitting 38, while the outside peripheral face of the flexible film 36 has been vulcanization bonded to the opening at the axial upper side of the outside peripheral caulking fitting 40. The flexible film 36 is thereby formed as an integrally vulcanization molded component incorporating the inside peripheral mating attachment fitting 38 and the outside peripheral caulking fitting 40.

The inside peripheral edge part of the flexible film 36 is attached to the first mounting member 12 by securing the inside peripheral mating attachment fitting 38 externally fitted onto the first mounting member 12; while the outside peripheral edge part of the flexible film 36 is attached to the second mounting member 14 by securely swaging the support portion 24 of the second mounting member 14 and the clasped portion 28 of the cover member 26 with the caulking piece 42 of the outside peripheral caulking fitting 40. The lower opening of the second mounting member 14 is thereby provided fluidtight closure by the cover member 26, and the flexible film 36 is arranged surrounding the main rubber elastic body 16 to its outside peripheral side. The inside peripheral mating attachment fitting 38 is fluidtightly attached to the first mounting member 12 via a rubber layer integrally formed with the main rubber elastic body 16 and anchored to the outside peripheral face of the first mounting member 12, while the outside peripheral caulking fitting 40 is fluidtightly attached to the second mounting member 14 via a rubber layer integrally formed with the flexible film 36 and anchored to the inside peripheral face of the outside peripheral caulking fitting 40.

By covering the lower opening of the second mounting member 14 with the cover member 26 in this way, between the axially opposed faces of the main rubber elastic body 16 and the cover member 26 to the inside peripheral side of the second mounting member 14 there is defined a pressure-receiving chamber 44 whose wall is constituted in part by the main rubber elastic body 16 and which gives rise to internal pressure fluctuations at times, of vibration input. Meanwhile, between the main rubber elastic body 16 and the flexible film 36 there is defined an equilibrium chamber 46 of annular form whose wall is constituted in part by the flexible film 36 and which permits changes in volume through elastic deformation of the flexible film 36. The pressure-receiving chamber 44 and the equilibrium chamber 46 are isolated fluidtightly from the outside and their interior is filled with a non-compressible fluid such as water. While imposing no particular limitation on the non-compressible fluid filling the chambers, a low-viscosity fluid is preferred in order to effectively achieve flow action of the fluid, discussed later.

A tunnel-like passage extending in the circumferential direction for prescribed length approximately halfway around the circumference is formed diametrically between the outside peripheral caulking fitting 40 and the cylindrical portion 21 of the second mounting member 14. One end of the passage communicates with the pressure-receiving chamber 44 through a communication hole 48 formed passing through the cylindrical portion 21 of the second mounting member 14, while the other end communicates with the equilibrium chamber 46 through a cutout in the upper end part of the second mounting member 14, and a slope 50 of groove form that opens onto the outside peripheral face of the main rubber elastic body 16. Thus, this tunnel-like passage is utilized to form a low-frequency orifice passage 52 connecting the pressure-receiving chamber 44 and the equilibrium chamber 46 to one another. The low-frequency orifice passage 52 and a high-frequency orifice passage 54 (to be discussed later) have tuning frequencies that can be adjusted through appropriate setting of the value of the ratio (A/L) of passage length (A) to passage cross-sectional area (L), while giving consideration to the wall spring rigidity of the pressure-receiving chamber 44 and the equilibrium chamber 46. In the present embodiment, the low-frequency orifice passage 52 is tuned to low frequency on the order of 10 Hz corresponding to engine shake. Also, in the present embodiment, the section of the flexible film 36 facing the slope 50 is relatively thick so as to prevent the opening on the equilibrium chamber 46 end of the low-frequency orifice passage 52 from becoming obstructed due to the flexible film 36 becoming stuck to the outside peripheral face of the main rubber elastic body 16 in the section where the slope 50 is formed.

Here, the pressure-receiving chamber 44 and the equilibrium chamber 46 communicate with one another through the high-frequency orifice passage 54. The high-frequency orifice passage 54 is composed of a tunnel-like passage that has been formed extending along a curved path through the interior of the first mounting member 12, and at one end opens onto the lower end face of the first mounting member 12 to communicate with the pressure-receiving chamber 44, and at the other end opens onto the outside peripheral face of the first mounting member 12 to communicate with the equilibrium chamber 46. The high-frequency orifice passage 54 is tuned to high frequency on the order of 15 to 40 Hz corresponding to idling vibration.

Furthermore, a first moveable member 56 consisting of a rubber plate is disposed in proximity to the end at the pressure-receiving chamber 44 side of the high-frequency orifice passage 54. The first moveable member 56 is formed by a rubber elastic body having approximately circular disk shape, and is situated accommodated inside a first housing space 58 that has been formed in the first mounting member 12.

The first housing space 58 has been formed in the interior of the first mounting member 12 by disposing a constraining fitting 62 to cover the mouth of a circular recess 60 that opens onto the lower end face of the first mounting member 12. The first housing space 58 is formed on the fluid channel of the high-frequency orifice passage 54, and communicates with the pressure-receiving chamber 44 through a circular hole 64 passing in the axial direction through the diametrical center section of the constraining fitting 62, as well as communicating with the equilibrium chamber 46 through a passage extending through the inside of the first mounting member 12. In the present embodiment, the high-frequency orifice passage 54 includes the first housing space 58 and the circular hole 64.

The first moveable member 56 is accommodated in the first housing space 58 so as to extend in the axis-perpendicular direction, and is oriented approximately orthogonal to the channel lengthwise direction on the fluid channel of the high-frequency orifice passage 54. Through this arrangement, pressure of the pressure-receiving chamber 44 will be exerted on the lower face of the first moveable member 56, and pressure of the equilibrium chamber 46 will be exerted on the upper face of the first moveable member 56. In the present embodiment, the first support member which supports the first moveable member 56 is constituted by the first mounting member 12. Also, in the present embodiment, the low-frequency orifice passage 52 and the high-frequency orifice passage 54 are formed independently of one another, with the low-frequency orifice passage 52 being disposed at a location away from the placement location of the first moveable member 56.

The dimensions of the first housing space 58 in the axial and diametrical directions are larger than the outside dimensions of the first moveable member 56 in the axial and diametrical directions. Thus, minute displacement of the first moveable member 56 due to relative pressure fluctuations of the pressure-receiving chamber 44 and the equilibrium chamber 46 will be allowed, while the extent of displacement of the first moveable member 56 will be limited through contact with the inside face of the first housing space 58, thereby limiting fluid flow through the high-frequency orifice passage 54.

The engine mount 10 constructed in the above manner is installed interposed between a power unit and a vehicle body by mounting the first mounting member 12 onto a component on the power unit side with the mounting portion 18, and mounting the second mounting member 14 onto a component on vehicle body side through the agency of the cover member 26, thereby providing vibration damped linkage of the power unit and the vehicle body.

With the engine mount 10 installed in a vehicle, when low-frequency, large-amplitude vibration corresponding to engine shake is input, pressure fluctuations will be exerted on the pressure-receiving chamber 44 through relative displacement of the first mounting member 12 and the second mounting member 14, giving rise to fluid flow through the low-frequency orifice passage 52 on the basis of relative pressure fluctuations of the pressure-receiving chamber 44 and the equilibrium chamber 46. Thus, the intended vibration damping action (high attenuation) will be effectively produced on the basis of flow action, such as resonance action, of fluid flowing through the low-frequency orifice passage 52.

Because the amplitude of low-frequency, large-amplitude vibration corresponding to engine shake, is greater than the tolerance for displacement of the first moveable member 56 in the plate thickness direction, at times of input of low-frequency, large-amplitude vibration, the first moveable member 56 which has been disposed on the fluid channel of the high-frequency orifice passage 54 will be constrained through contact against the wall face of the first housing space 58, and the high-frequency orifice passage 54 will assume a substantially obstructed state. This will prevent pressure fluctuations of the pressure-receiving chamber 44 from diminishing in intensity due to fluid flow through the high-frequency orifice passage 54, so that fluid flow can be produced efficiently through the low-frequency orifice passage 52.

On the other hand, at times of input of high-frequency, small-amplitude vibration corresponding to idling vibration, the first moveable member 56 will experience minute displacement in the axial direction (which is also the plate thickness direction) on the basis of relative pressure fluctuations of the pressure-receiving chamber 44 and the equilibrium chamber 46, and the high-frequency orifice passage 54 will assume a substantially communicating state. Fluid flow will be produced through the high-frequency orifice passage 54, and the intended vibration damping action (low dynamic spring) will be effectively obtained on the basis of flow action, such as resonance action, of fluid flowing through the high-frequency orifice passage 54.

Also, at times of input of high-frequency, small-amplitude vibration, the low-frequency orifice passage 52, which has been tuned to a lower frequency than the input vibration frequency, will clog through antiresonance-like action and assume a substantially blocked state. This will prevent liquid pressure of the pressure-receiving chamber 44 from escaping into the equilibrium chamber 46 through the low-frequency orifice passage 52, so that ample fluid flow through the high-frequency orifice passage 54 can be efficiently assured. As a result, vibration damping action by the high-frequency orifice passage 54 can be obtained advantageously.

In the engine mount 10 according to the present embodiment, the first housing space 58 which accommodates the first moveable member 56 is formed in the first mounting member 12 which is linked to the power unit, providing an arrangement whereby the first moveable member 56 will strike against the first mounting member 12 during input of low-frequency, large-amplitude vibration. As a result, the main rubber elastic body 16 has been situated on the path over which colliding force produced by contact of the first moveable member 56 is transmitted to the vehicle body side. Thus, before it can be transmitted to the vehicle body side colliding force of contact of the first moveable member 56 against the inside face of the first housing space 58 will be attenuated very effectively through energy loss on the basis of factors such as internal friction of the main rubber elastic body 16, thereby preventing the problem of noise and vibration inside the cabin caused by this colliding force.

In the present embodiment in particular, the first mounting member 12 which supports the first moveable member 56 is anchored embedded in the diametrical center section of the main rubber elastic body 16, while the second mounting member 14 which is linked to the vehicle body is anchored juxtaposed against the outside peripheral face of the main rubber elastic body 16. It is therefore assured that the main rubber elastic body 16 will have ample free length enabling it to attenuate striking noise (colliding force) arising from contact of the first moveable member 56 and the first housing space 58, so that reductions in noise and vibration may be achieved more effectively.

Moreover in the present embodiment, the pressure-receiving chamber 44 and the equilibrium, chamber 46 are formed separated by the main rubber elastic body 16, while the high-frequency orifice passage 54 and the first moveable member 56 are built into the first mounting member 12. For this reason, as compared to a construction in which the pressure-receiving chamber and the equilibrium chamber are formed in series, and a high-frequency orifice passage and moveable member are provided to a partition member disposed between the pressure-receiving chamber and the equilibrium chamber, the dimension in the axial direction can be smaller, contributing to more compact vehicle size.

Additionally, in the present embodiment, the low-frequency orifice passage 52 is formed to the outside peripheral side of the second mounting member 14 which is a large-diameter cylinder, so that ample passage length of the low-frequency orifice passage 52 can be efficiently assured. This can provide a greater degree of freedom in tuning of the low-frequency orifice passage 52, which is tuned to low frequency, providing effective vibration damping action of vibration targeted for damping.

Further, when energy simulating that arising from contact of the first moveable member 56 was input to the engine mount 10 constructed according to the present embodiment, and vibration caused by transmission of this contact energy to the vehicle body side was measured, it was found that such vibration was reduced to a level approximately one-fifth that observed in engine mounts of conventional design.

Figure 2:
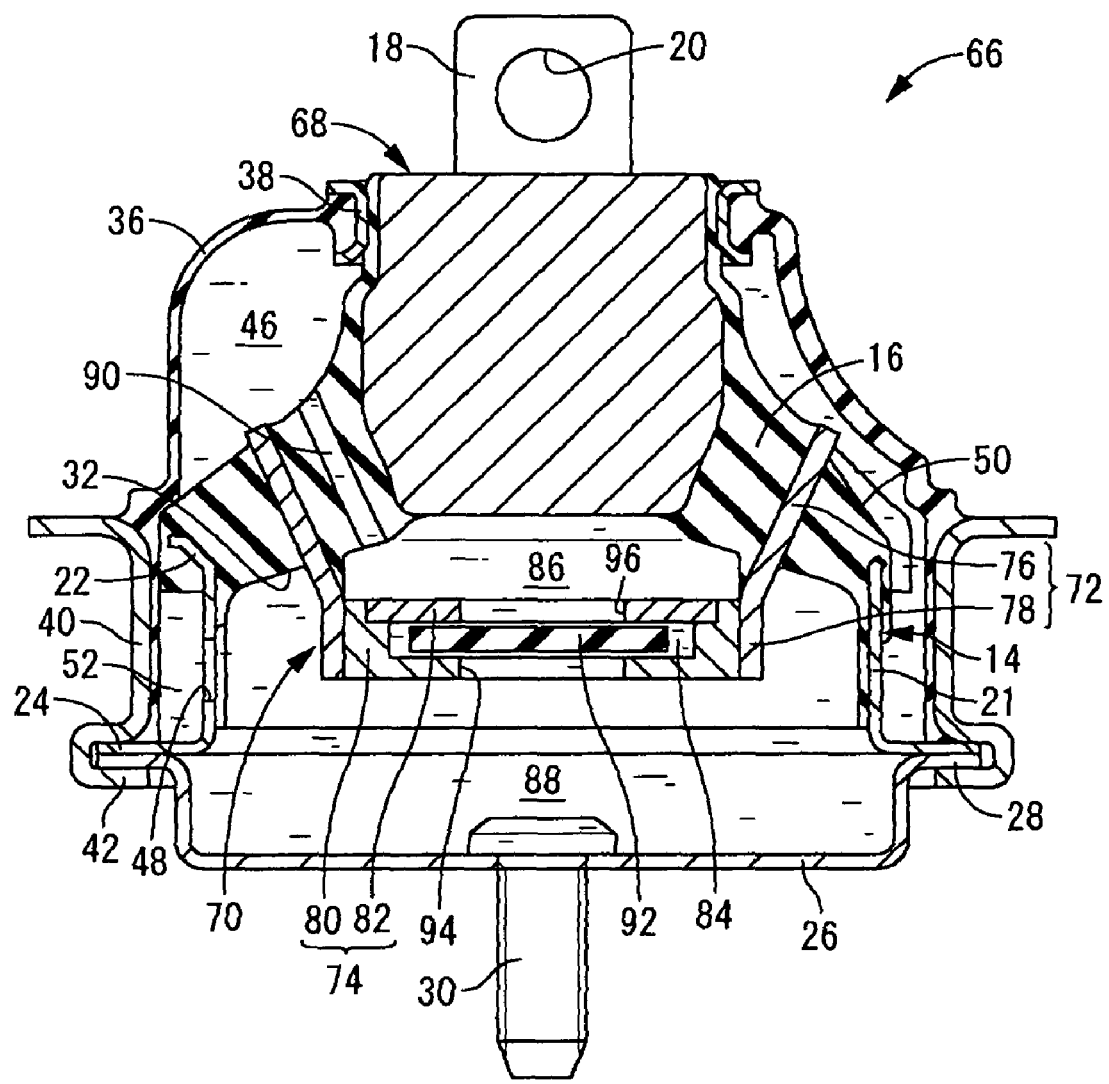
FIG. 2 is a vertical cross sectional view of an automotive engine mount according to a second embodiment of the present invention.

Next, FIG. 2 depicts an automotive engine mount 66 described as a second embodiment of the fluid-filled type vibration damping device constructed according to the present invention. In the following description, components and parts that are substantially identical to those in the preceding first embodiment will be assigned the same drawing symbols and will not be discussed.

Specifically, in this engine mount 66, no first high-frequency orifice passage 54 or first housing space 58 is formed in the metal first mounting member 68, which instead has a solid, approximately circular post shape. A medial support member 70 made of metal is disposed between the first mounting member 68 and the second mounting member 14. The medial support member 70 includes an anchoring support fitting 72 and a dividing wall fitting 74.

The anchoring support fitting 72 has approximately circular cylinder shape as a whole and is arranged encircling the first mounting member 68 to the outside peripheral side. The anchoring support fitting 72 in its upper section defines an anchoring portion 76 of tapered shape progressively flaring out towards the top, and in its lower section defines a support portion 78 of cylindrical form extending in the axial direction. The anchoring support fitting 72 is disposed with its anchoring portion 76 vulcanization bonded to the diametrically medial section of the main rubber elastic body 16 and elastically supported by the main rubber elastic body 16. In the present embodiment, the main rubber elastic body 16 is bifurcated by separation into an inside peripheral side and an outside peripheral side to either side of the anchoring support fitting 72. Also, in the present embodiment, the main rubber elastic body 16 is provided as an integrally vulcanization molded component incorporating the first mounting member 68, the second mounting member 14, and the medial support member 70.

In the anchoring support fitting 72 which is supported by the main rubber elastic body 16, the support portion 78 extends out towards the bottom from the main rubber elastic body 16, and projects into the pressure-receiving chamber 44. The dividing wall fitting 74, which is approximately circular disk-shaped, is then secured pressure-fit into the cylindrical support portion 78. The dividing wall fitting 74 has a construction including a dividing wall body 80 having approximately bottomed circular cylinder shape whose mouth is covered by a cover plate fitting 82, forming a circular first housing space 84 in the interior.

The dividing wall fitting 74 of the above construction is secured pressure-fit to the inside peripheral side of the support portion 78 and is supported by the main rubber elastic body 16 through the agency of the anchoring support fitting 72. A middle chamber 86 whose wall is constituted in part by the main rubber elastic body 16 is thereby defined between the first mounting member 68 and the dividing wall fitting 74. Meanwhile, a pressure-receiving chamber 88 whose wall is constituted in part by the main rubber elastic body 16 is defined between the cover member 26 and the dividing wall fitting 74. Like the equilibrium chamber 46, the middle chamber 86 and the pressure-receiving chamber 88 are filled with a non-compressible fluid.

A low-frequency orifice passage 52 is formed extending in the circumferential direction diametrically between the second mounting member 14 and the outside peripheral caulking fitting 40 so as to connect the pressure-receiving chamber 88 and the equilibrium chamber 46 to one another; while a high-frequency orifice passage 90 is formed in the main rubber elastic body 16 and connects the middle chamber 86 and the equilibrium chamber 46 to one another. The high-frequency orifice passage 90 is formed so as to pass through the main rubber elastic body 16 to the inside peripheral side of the anchoring support fitting 72; one end opens onto the inside peripheral face of the main rubber elastic body 16 to communicate with the middle chamber 86, while the other end opens onto the outside peripheral face of the main rubber elastic body 16 to communicate with the equilibrium chamber 46. In the present embodiment, as in the first embodiment discussed previously, the high-frequency orifice passage 90 is tuned to high frequency corresponding to idling vibration.

A first moveable member 92 consisting of a rubber plate is arranged in the first housing space 84 of the dividing wall fitting 74. The arrangement is such that pressure of the pressure-receiving chamber 88 will be exerted on the lower face of the first moveable member 92 through a lower communication hole 94 that passes in the axial direction through the base wall part of the dividing wall body 80, while pressure of the middle chamber 86 will be exerted on the upper face of the first moveable member 92 through an upper communication hole 96 that passes in the axial direction through the diametrical center part of the cover plate fitting 82. In the present embodiment, the first support member which supports the first moveable member 92 is constituted by the medial support member 70.

Further, in the present embodiment, the first moveable member 92 is allowed to undergo minute displacement in the plate thickness direction, while the extent of displacement in the plate thickness direction is limited by contact against the dividing wall fitting 74. Thus, as in the preceding first embodiment, during input of small-amplitude vibration corresponding to idling vibration, minute displacement of the first moveable member 92 will give rise to liquid pressure transmitting action, whereas during input of large-amplitude vibration corresponding to engine shake, the first moveable member 92 will be constrained, thus arresting transmission of liquid pressure between the middle chamber 86 and the pressure-receiving chamber 88.

The engine mount 66 constructed according to the present embodiment is installed in a vehicle by mounting the first mounting member 68 onto the power unit side, and mounting the second mounting member 14 onto the vehicle body side.

When installed in a vehicle, if low-frequency, large-amplitude vibration corresponding to engine shake is input across the first mounting member 68 and the second mounting member 14, fluid flow between the pressure-receiving chamber 88 and the equilibrium chamber 46 through the low-frequency orifice passage 52 will arise on the basis of relative pressure fluctuations of the pressure-receiving chamber 88 and the equilibrium chamber 46. Thus, higher attenuation will be produced on the basis of flow action of the fluid.

Because displacement of the first moveable member 92 is limited at times of input of low-frequency, large-amplitude vibration, it is possible to prevent internal pressure fluctuations arising in the pressure-receiving chamber 88 from being transmitted to the middle chamber 86 and escaping to the equilibrium chamber 46 through the high-frequency orifice passage 90. Thus, ample fluid flow through the low-frequency orifice passage 52 can be advantageously assured, and vibration damping action based on flow action of the fluid can be efficiently achieved.

On the other hand, when high-frequency, small-amplitude vibration corresponding to idling vibration is input, the first moveable member 92 will experience minute displacement in the plate thickness direction on the basis of relative pressure fluctuations of the pressure-receiving chamber 88 and the middle chamber 86. The liquid pressure of the pressure-receiving chamber 88 will thereby be transmitted to the middle chamber 86, creating a relative pressure differential between the middle chamber 86 and the equilibrium chamber 46. Due to this pressure differential, fluid flow will arise between the middle chamber 86 and the equilibrium chamber 46 through the high-frequency orifice passage 90, and low dynamic spring will be produced on the basis of flow action of the fluid. In the present embodiment, the high-frequency orifice passage 90 is disposed connecting the pressure-receiving chamber 88 and the equilibrium chamber 46 to one another via the middle chamber 86, the first housing space 84, and the upper and lower communication holes 96, 94, with the first moveable member 92 being situated on the fluid channel connecting the pressure-receiving chamber 88 and the equilibrium chamber 46 through the high-frequency orifice passage 90.

Also, at times of input of high-frequency, small-amplitude vibration, the low-frequency orifice passage 52 will experience clogging due to antiresonance and will become substantially obstructed, thus advantageously assuring ample fluid flow through the high-frequency orifice passage 90 so that the intended vibration damping action is produced with efficiency.

Here, the first moveable member 92 has been installed in the medial support member 70 which is supported by the main rubber elastic body 16, so that noise and vibration produced by striking of the first moveable member 92 will be minimized. Specifically, in the event that input of large-amplitude vibration produced by engine shake or driving over a bump causes the first moveable member 92 to strike against the wall of the first housing space 84, the colliding force exerted on the medial support member 70 due to this contact will be transmitted to the second mounting member 14 via the main rubber elastic body 16. Thus, the colliding force will be attenuated through factors such as internal friction of the main rubber elastic body 16, reducing the energy transmitted to the vehicle body. Consequently, noise and vibration produced in the cabin of the car due to striking of the first moveable member 92 can be prevented.

Figure 3:
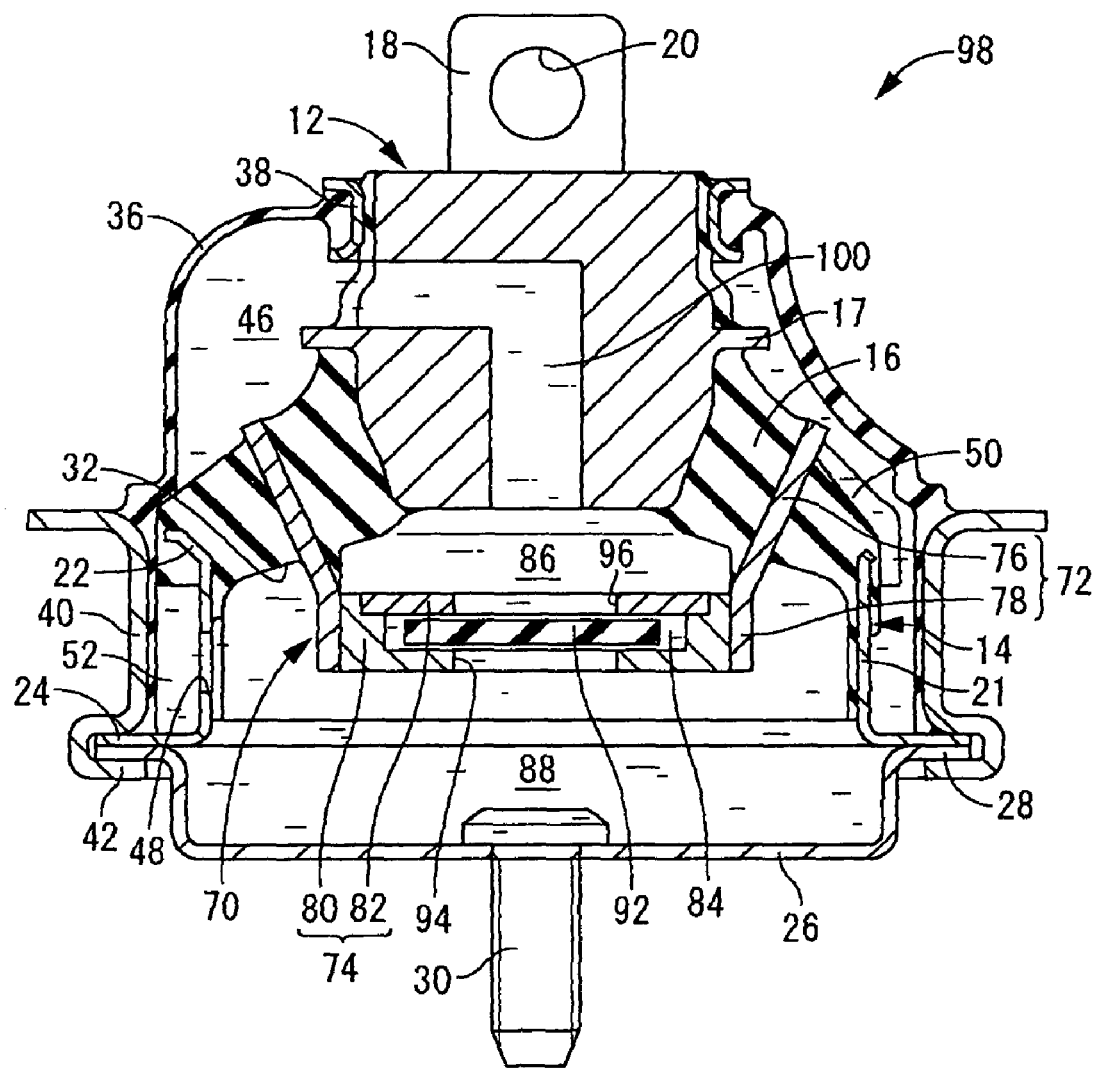
FIG. 3 is a vertical cross sectional view of an automotive engine mount according to a third embodiment of the present invention.

FIG. 3 depicts an automotive engine mount 98 described as a third embodiment of the fluid-filled type vibration damping device constructed according to the present invention. In this engine mount 98, in place of the high-frequency orifice passage 90 there is instead formed a high-frequency orifice passage 100 that passes through the first mounting member 12 and connects the middle chamber 86 with the equilibrium chamber 46. To describe in more detail, like the high-frequency orifice passage 54 shown in the preceding first embodiment, the high-frequency orifice passage 100 is formed so as to extend through the inside of the first mounting member 12, with a first end opening onto the lower face of the first mounting member 12 and communicating with the middle chamber 86, and the other end opening onto the outside peripheral face of the first mounting member 12 and communicating with the equilibrium chamber 46. As in the preceding second embodiment, the engine mount 98 constructed in this way can produce effective vibration damping action of both low-frequency vibration and high-frequency vibration, as well as preventing noise and vibration from occurring due to contact by the first moveable member 92. Because the engine mount 98 basically has the same construction as the engine mount 66 shown in the preceding second embodiment, like symbols have been used in the drawings and descriptions have been omitted.

Figure 4:
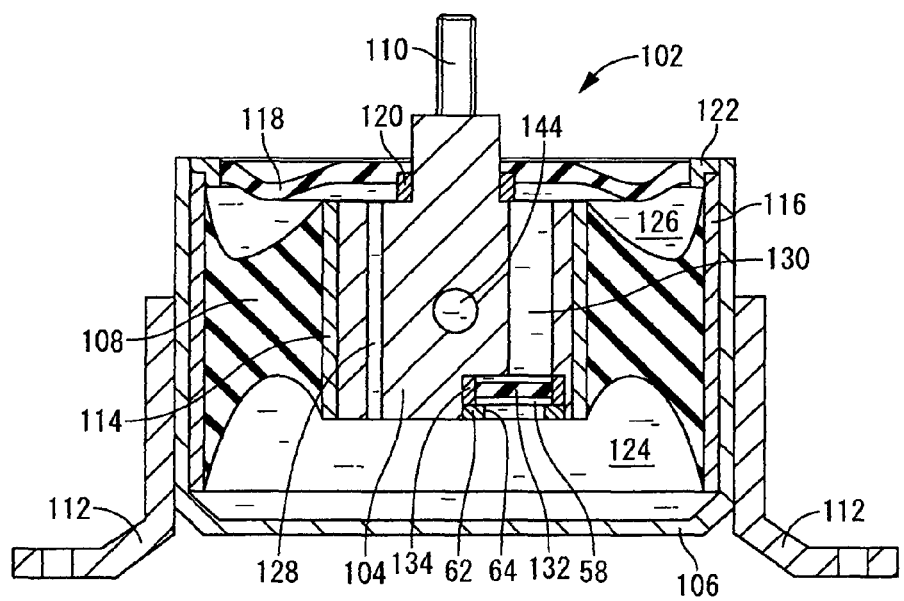
FIG. 4 is a vertical cross sectional view of an automotive engine mount according to a fourth embodiment of the present invention.
Figure 5:
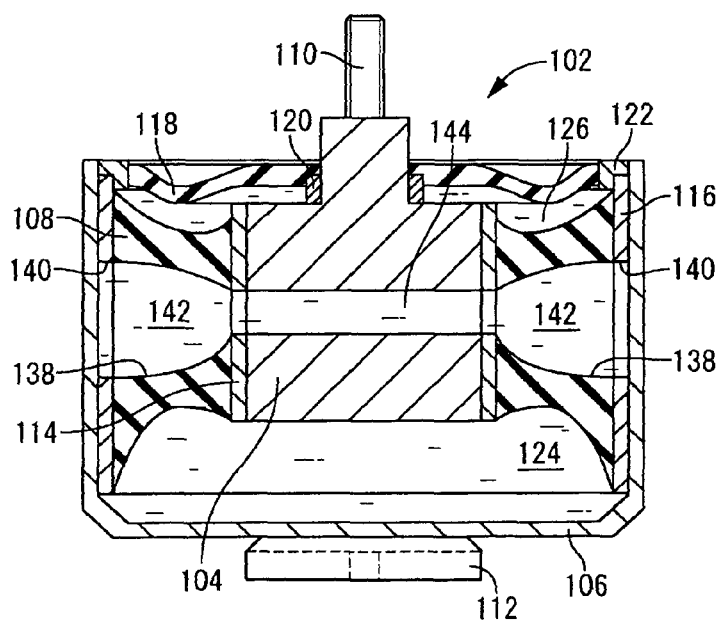
FIG. 5 is another vertical cross sectional view of the engine mount.

Next, FIGS. 4 and 5 depict an automotive engine mount 102 described as a fourth embodiment of the fluid-filled type vibration damping device constructed according to the present invention. The engine mount 102 has a construction in which a metal first mounting member 104 and a metal second mounting member 106 are linked by a main rubber elastic body 108.

The first mounting member 104 is a high-rigidity member having a stepped, approximately circular post shape whose axial lower side serves as a large-diameter insertion portion, and is integrally furnished with a fastening bolt 110 that projects axially upward along the center axis. The first mounting member 104 is mounted onto the power unit (not shown) by securing the fastening bolt 110 to the power unit side.

Meanwhile, the second mounting member 106 is a high-rigidity member having thin-walled, large-diameter, approximately bottomed circular cylinder shape and is positioned so that the peripheral wall portion thereof defining a cylindrical portion is spaced apart from and encircles the outside peripheral side of the insertion portion of the first mounting member 104. A pair of mounting leg portions 112, 112 are secured to the outside peripheral face of the second mounting member 106. Each mounting leg portion 112 is integrally furnished with a curved portion adapted to be juxtaposed against and secured to the outside peripheral face of the second mounting member 106, and a flat plate portion that extends outwardly in the axis-perpendicular direction at the lower end of the curved portion, with a bolt hole formed passing through the flat plate portion. The mounting leg portions 112, 112 are then bolted to the vehicle body side by a mounting bolt (not shown) passed through the bolt hole formed in each mounting leg portion 112, to secure the second mounting member 106 to the vehicle body. The fastening bolt 110 of the first mounting member 104 projects upward beyond the peripheral wall part of the second mounting member 106.

The main rubber elastic body 108 is interposed between the diametrically opposed faces of the insertion portion of the first mounting member 104 and the peripheral wall portion of the second mounting member 106. The main rubber elastic body 108 has approximately circular cylinder shape as a whole, and has an inside peripheral mating attachment fitting 114 of small-diameter circular cylinder shape vulcanization bonded to its inside peripheral face, and an outside peripheral mating attachment fitting 116 of large-diameter circular cylinder shape juxtaposed against and vulcanization bonded to its outside peripheral face. That is, in the present embodiment the main rubber elastic body 108 takes the form of an integrally vulcanization molded component incorporating the inside peripheral mating attachment fitting 114 and the outside peripheral mating attachment fitting 116. This main rubber elastic body 108 integrally vulcanization molded component is arranged between the first mounting member 104 and the second mounting member 106 by securing the first mounting member 104 by pressure fitting it into the inside peripheral mating attachment fitting 114, and securing the second mounting member 106 by pressure fitting it into the outside peripheral mating attachment fitting 116. The first mounting member 104 and the second mounting member 106 are elastically linked by the main rubber elastic body 108.

A flexible film 118 is arranged between the diametrically opposed faces of the small-diameter section of the first mounting member 104 and the upper edge of the peripheral wall portion of the second mounting member 106. The flexible film 118 is a rubber film having thin, approximately circular disk shape and having slack in the axial direction. An inside peripheral fastener fitting 120 of small-diameter annular shape has been vulcanization bonded to the inside peripheral edge part of the flexible film 118, and an outside peripheral fastener fitting 122 of large-diameter annular shape has been vulcanization bonded to the outside peripheral face. Then the inside peripheral fastener fitting 120 is secured through mated attachment to the small-diameter section of the first mounting member 104 and the outside peripheral fastener fitting 122 is secured through mated attachment to the peripheral wall portion of the second mounting member 106, thereby positioning the flexible film 118 diametrically between the first mounting member 104 and the second mounting member 106. In the present embodiment, the flexible film 118 takes the form of an integrally vulcanization molded component incorporating the inside peripheral fastener fitting 120 and the outside peripheral fastener fitting 122.

By attaching the main rubber elastic body 108 integrally vulcanization molded component and the flexible film 118 integrally vulcanization molded component to the first mounting member 104 and the second mounting member 106 in this way, to the axial lower side of the main rubber elastic body 108 there is defined a pressure-receiving chamber 124 whose wall is composed in part of the main rubber elastic body 108. Meanwhile, to the axial upper side of the main rubber elastic body 108 there is defined an equilibrium chamber 126 whose wall is composed in part of the flexible film 118. The pressure-receiving chamber 124 and the equilibrium chamber 126 are filled with a non-compressible fluid. In the present embodiment, the construction of the second mounting member 106 is integrally furnished with a cylindrical portion and a cover member.

Two circular holes have been formed in the first mounting member 104 and pass through its large-diameter section in the axial direction. These two circular holes have mutually different diameters, the small-diameter circular hole defining a low-frequency orifice passage 128 that connects the pressure-receiving chamber 124 with the equilibrium chamber 126, and the large-diameter circular hole defining a high-frequency orifice passage 130 that connects the pressure-receiving chamber 124 with the equilibrium chamber 126. In the present embodiment, the low-frequency orifice passage 128 is tuned to low frequency corresponding to engine shake, while the high-frequency orifice passage 130 is tuned to high frequency corresponding to idling vibration.

A first moveable member 132 consisting of a moveable rubber film is disposed on the fluid channel of the high-frequency orifice passage 130. The first moveable member 132 is made of an approximately circular disk shaped rubber elastic body with a ring-shaped fastener fitting 134 vulcanization bonded to its outside peripheral face. The first moveable member 132 is positioned within a first housing space 58 that has been formed at the mouth on the pressure-receiving chamber 124 side of the high-frequency orifice passage 130, and is oriented so as to extend approximately orthogonal to the lengthwise direction of the high-frequency orifice passage 130. With this arrangement, the level of fluid flow through the high-frequency orifice passage 130 will be limited by the elasticity of the first moveable member 132.

In the present embodiment, a pair of pocket portions 138, 138 have been formed on the circumference of the main rubber elastic body 108 in zones thereof situated in opposition along an axis in the diametrical direction. Each pocket portion 138 is of recessed shape having the inside peripheral mating attachment fitting 114 as its base face on the inside peripheral side, and opening onto the outside peripheral face through a window 140 formed in the outside peripheral mating attachment fitting 116. By covering the windows 140 with the peripheral wall portion of the second mounting member 106 there are defined within the main rubber elastic body 108 a pair of fluid chambers 142, 142 filled with a non-compressible fluid. In the present embodiment, the pair of fluid chambers 142, 142 are situated in opposition along an axis lying in the axis-perpendicular direction, to either side of the insertion portion of the first mounting member 104; with the engine mount 102 installed in a vehicle, the direction of opposition of the pair of fluid chambers 142, 142 will be aligned with the front-back direction of the vehicle. In the present embodiment, hollows are formed on both axial faces of the main rubber elastic body 108 at either side of an axis in the axis-perpendicular direction which is orthogonal to the direction of opposition of the pair of fluid chambers 142, 142, to adjust its spring in the axis-perpendicular direction.

In addition, a circular hole is formed in the large-diameter section (insertion portion) of the first mounting member 104 and extends completely through it in a straight line along an axis in the axis-perpendicular direction. This circular hole is formed in a zone of the first mounting member 104 situated away from low-frequency orifice passage 100 and the high-frequency orifice passage 130, and connects at its two ends to the pair of fluid chambers 142, 142 through communication holes which have been formed passing through the inside peripheral mating attachment fitting 114. Utilizing this circular hole, there is formed a first connecting passage 144 the connects the pair of fluid chambers 142, 142 to one another along their direction of opposition. In the present embodiment, the first connecting passage 144 is tuned to low frequency on the order of 10 Hz.

In the automotive engine mount 102 constructed according to the present embodiment, when low-frequency, large-amplitude vibration corresponding to engine shake is input in the axial direction, vibration damping action will be produced on the basis of flow action of fluid by fluid flow through the low-frequency orifice passage 100.

Also, at times of input of large-amplitude vibration, fluid flow through the high-frequency orifice passage 130 will be limited because further elastic deformation of the first moveable member 132 beyond a certain level of major deformation is limited. Thus, ample fluid flow through the low-frequency orifice passage 100 may be advantageously assured, and the intended vibration damping action can be produced efficiently. Also, because the first moveable member 132 is supported by the first mounting member 104, even if the first moveable member 132 has experienced major deformation, striking noise produced by contact can be prevented from being transmitted to the vehicle body side. Moreover, by employing a moveable film structure securely supported at its outside peripheral edge part with respect to the first mounting member 104, the occurrence of striking noise caused by striking can be advantageously prevented.

When high-frequency, small-amplitude vibration corresponding to idling vibration is input in the axial direction, vibration damping action will be produced on the basis of flow action of fluid by fluid flow through the high-frequency orifice passage 130. Also, at times of input of high-frequency, small-amplitude vibration, the low-frequency orifice passage 100 will become substantially blocked due to antiresonance, so ample fluid flow through the high-frequency orifice passage 130 can be advantageously assured, and the intended vibration damping action can be obtained efficiently.

If on the other hand, low-frequency vibration is input to the engine mount 102 in the direction of opposition of the pair of fluid chambers 142, 142 due for example to acceleration or deceleration of the car, a relative pressure differential will arise between the pair of fluid chambers 142, 142. This will result in fluid flow through the first connecting passage 144 which connects the pair of fluid chambers 142, 142 to one another, producing vibration damping action based on flow action of the fluid.

Figure 6:
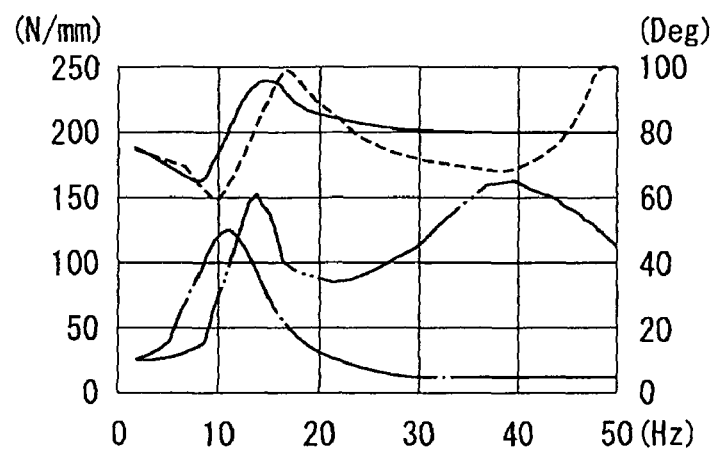
FIG. 6 is a graph showing vibration damping characteristics of the engine mount in the axial direction.

FIG. 6 depicts vibration damping characteristics of the engine mount 102 in the axial direction. In FIG. 6, dynamic spring observed during input of large-amplitude vibration is indicated by the solid line, and dynamic spring observed during input of small-amplitude vibration is indicated by the broken line; attenuation observed during input of large-amplitude vibration is indicated by single-dot and dash line, while attenuation observed during input of small-amplitude vibration is indicated by double-dot and dash line. According to this diagram, high attenuation at low frequencies on the order of 10 Hz is produced during input of large-amplitude vibration, when the high-frequency orifice passage 130 assumes the blocked state. On the other hand, low dynamic spring and high attenuation at high frequencies on the order of 30 to 40 Hz are produced during input of small-amplitude vibration, when the high-frequency orifice passage 130 assumes the communicating state.

Figure 7:
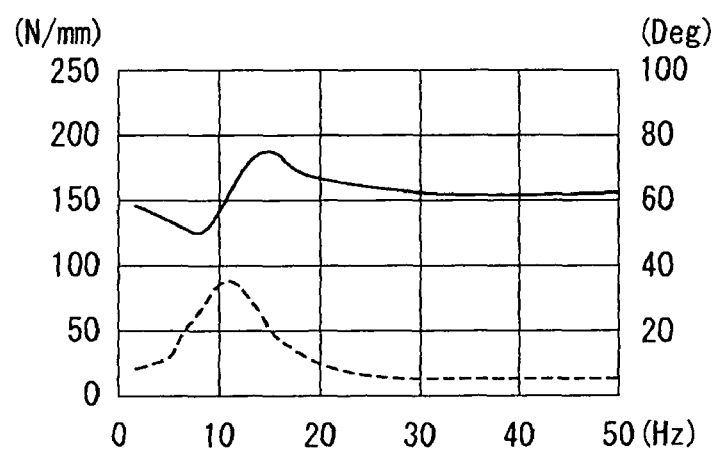
FIG. 7 is a graph showing vibration damping characteristics of the engine mount in the axis-perpendicular direction.

FIG. 7, on the other hand, depicts vibration damping characteristics of the engine mount 102 in the axis-perpendicular direction. In FIG. 7, dynamic spring is indicated by the solid line, and attenuation by the broken line. According to this diagram, high attenuation is produced at low frequencies on the order of 10 Hz.

In the preceding fourth embodiment, the low-frequency orifice passage 100 which connects the pressure-receiving chamber 124 and the equilibrium chamber 126 is formed utilizing a circular hole that extends in a straight line in the axial direction; however, a low-frequency orifice passage 148 could instead extend in the circumferential direction as in the automotive engine mount 146 according to a fifth embodiment depicted in FIGS. 8 and 9. In the following description, components and parts that are substantially identical to those in the preceding fourth embodiment will be assigned the same drawing symbols and will not be discussed.

In more detail, in the first mounting member 104 of the engine mount 146 there is formed a circumferential groove 149 opening onto the outside peripheral face and extending in a helical pattern. By pressure fitting the first mounting member 104 into the inside peripheral mating attachment fitting 114, the outside peripheral opening of the circumferential groove 149 will be covered by the inside peripheral mating attachment fitting 114 to define a tunnel-like passage that extends in the circumferential direction while sloping in the axial direction. One end of this tunnel-like passage connects to the pressure-receiving chamber 124, while the other end connects to the equilibrium chamber 126, thereby forming a low-frequency orifice passage 148 that connects the pressure-receiving chamber 124 and the equilibrium chamber 126 to one another. In the present embodiment, as in the preceding fourth embodiment, the low-frequency orifice passage 148 is tuned to low frequency on the order of 10 Hz.

By employing such a construction, ample passage length (L) of the low-frequency orifice passage 148 which is tuned to low frequency can be efficiently assured. For this reason, the tuning frequency of the low-frequency orifice passage 148 can be easily set to low frequency without any increase in size of the first mounting member 104, and a large degree of freedom in tuning of the low-frequency orifice passage 148 can be assured.

Figure 10:
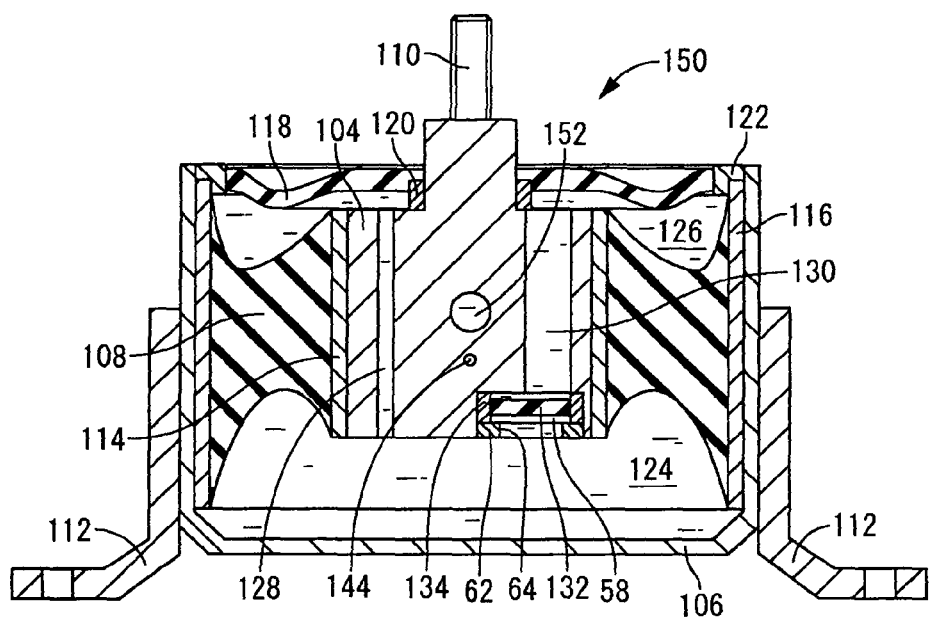
FIG. 10 is a vertical cross sectional view of an automotive engine mount according to a sixth embodiment of the present invention.
Figure 11:
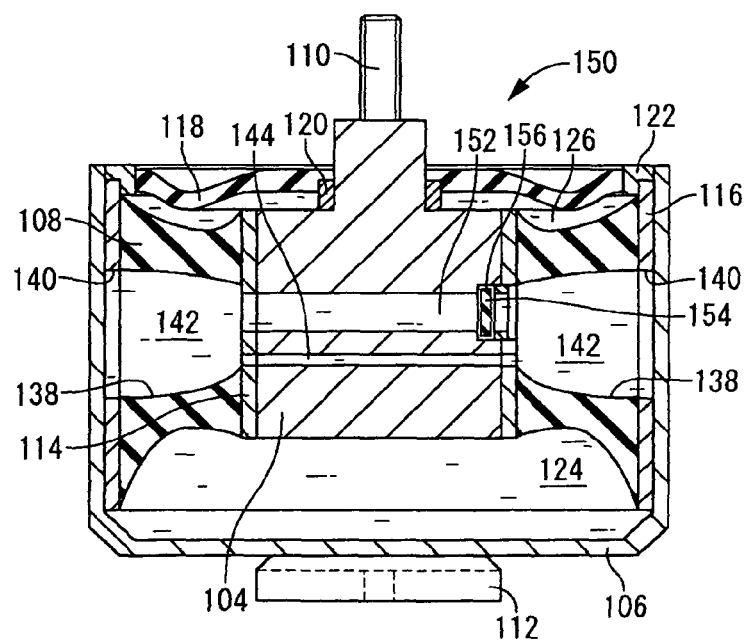
FIG. 11 is another vertical cross sectional view of the engine mount.

Next, an automotive engine mount 150 described as a sixth embodiment of the fluid-filled type vibration damping device constructed according to the present invention is depicted in FIGS. 10 and 11. The engine mount 150 has a low-frequency first connecting passage 144 tuned to a low frequency range, a high-frequency first connecting passage 152 tuned to a high frequency range, and a pair of fluid chambers 142, 142 connected to one another by the low-frequency and high-frequency first connecting passages 144, 152.

The high-frequency first connecting passage 152 is formed utilizing a circular hole that extends in a straight line passing in the axis-perpendicular direction through the first mounting member 104 and whose two ends connect to the pair of fluid chambers 142, 142 through communication holes that have been formed passing through the inside peripheral mating attachment fitting 114. The high-frequency first connecting passage 152 is formed in a zone of the first mounting member 104 situated away from the low-frequency first connecting passage 144, and in the present embodiment, the low-frequency first connecting passage 144 and the high-frequency first connecting passage 152 are formed independently of one another. The high-frequency first connecting passage 152 has passage length (L) about equal to that of the low-frequency first connecting passage 144, but passage cross-sectional area (A) that is larger than that of the low-frequency first connecting passage 144. Thus, the tuning frequency of the high-frequency first connecting passage 152, which is set on the basis of the ratio (A/L) of passage cross-sectional area to passage length, is set to a higher frequency than the low-frequency first connecting passage 144.

A second moveable member 154 consisting of a rubber plate is disposed on the fluid channel of the high-frequency first connecting passage 152. The second moveable member 154 is formed by a rubber elastic body of approximately circular disk shape, and is accommodated within a second housing space 156 that has been provided at one opening of the high-frequency first connecting passage 152 in the first mounting member 104. The second moveable member 154 is oriented so that it extends in the approximately orthogonal direction with respect to the lengthwise direction of the high-frequency first connecting passage 152, and so as to allow minute displacement in the plate thickness direction, which is also the lengthwise direction of the high-frequency first connecting passage 152. With this arrangement, at times of input of small-amplitude vibration, the high-frequency first connecting passage 152 will be held in the communicating state through minute displacement of the second moveable member 154, whereas at times of input of large-amplitude vibration, the second moveable member 154 will be constrained through contact with the wall of the second housing space 156 so that the high-frequency first connecting passage 152 becomes blocked. In the present embodiment, a second support member for supporting the second moveable member 154 is constituted by the first mounting member 104, which is elastically linked to the second mounting member 106 via the main rubber elastic body 108.

In the engine mount 150 according to the present embodiment, when low-frequency, large-amplitude vibration is input in the axis-perpendicular direction, the intended vibration damping action will be produced by fluid flow through the low-frequency first connecting passage 144. Also, at times of input of low-frequency, large-amplitude vibration, through limited displacement of the second moveable member 154 and blocking of the high-frequency first connecting passage 152, ample fluid flow through the low-frequency first connecting passage 144 will be advantageously assured so that vibration damping action may be produced efficiently.

On the other hand, when high-frequency, small-amplitude vibration is input in the axis-perpendicular direction, the intended vibration damping action will be produced by fluid flow through the high-frequency first connecting passage 152. Also, at times of input of high-frequency, small-amplitude vibration, the first connecting passage 144, which has been tuned to low frequency, will become substantially blocked due to antiresonance, thereby advantageously assuring ample fluid flow through the high-frequency first connecting passage 152 so that vibration damping action will be produced efficiently.

In this way it is possible for the connecting passages connecting the fluid chambers 142, 142 to be composed of a plurality of orifice passages 144, 152 tuned to different frequencies, so that vibration damping capability of vibration input in the axis-perpendicular direction can be improved.

The second moveable member 154 which is adapted to switch the high-frequency first connecting passage 152 between the communicating state and the blocked state is supported by the first mounting member 104, which has been mounted onto the power unit side. For this reason, transmission to the vehicle body side of striking noise produced by contact between the second moveable member 154 and the first mounting member 104 can be reduced by utilizing the energy attenuation afforded by elastic deformation of the main rubber elastic body 108.

Figure 12:
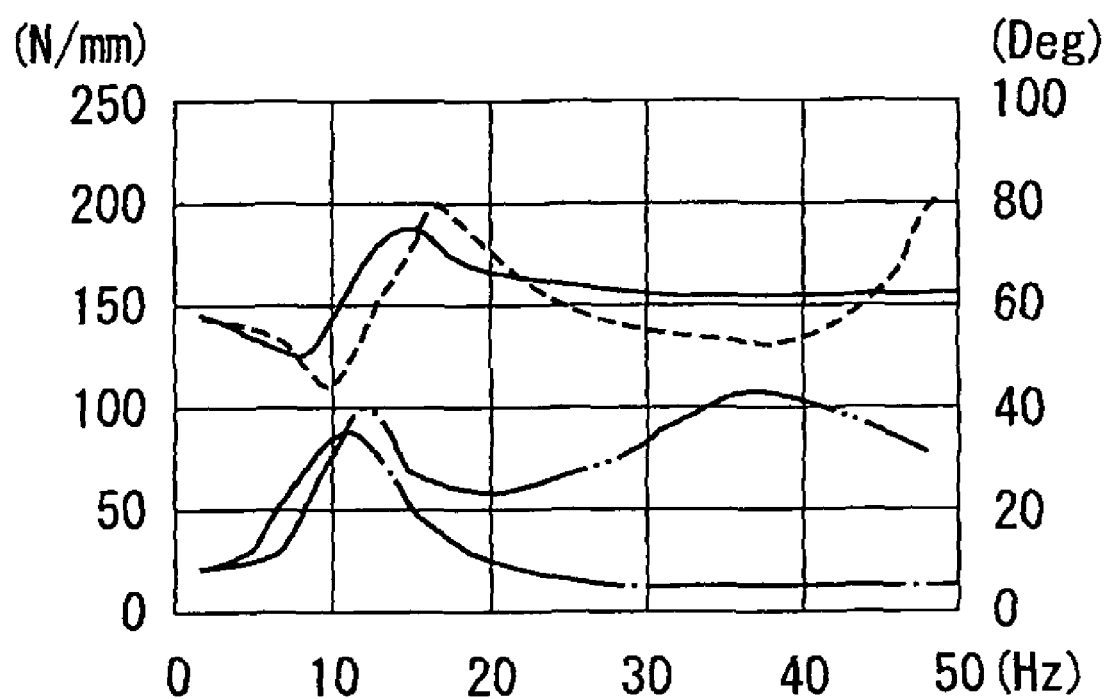
FIG. 12 is a graph showing vibration damping characteristics of the engine mount in the axis-perpendicular direction.

FIG. 12 depicts vibration damping characteristics of the engine mount 150 in the axis-perpendicular direction. In FIG. 12, dynamic spring observed during input of large-amplitude vibration is indicated by the solid line, and dynamic spring observed during input of small-amplitude vibration is indicated by the broken line; attenuation observed during input of large-amplitude vibration is indicated by single-dot and dash line, while attenuation observed during input of small-amplitude vibration is indicated by double-dot and dash line. According to this diagram, high attenuation at low frequencies on the order of 10 Hz is produced during input of large-amplitude vibration, when the high-frequency first connecting passage 152 assumes the blocked state. On the other hand, low, dynamic spring and high attenuation at high frequencies on the order of 30 to 40 Hz are produced during input of small-amplitude vibration, when the high-frequency first connecting passage 152 assumes the communicating state. The axial direction vibration damping characteristics of the engine mount 150 are approximately the same as those shown in FIG. 6, and will not be discussed here.

Figure 13:
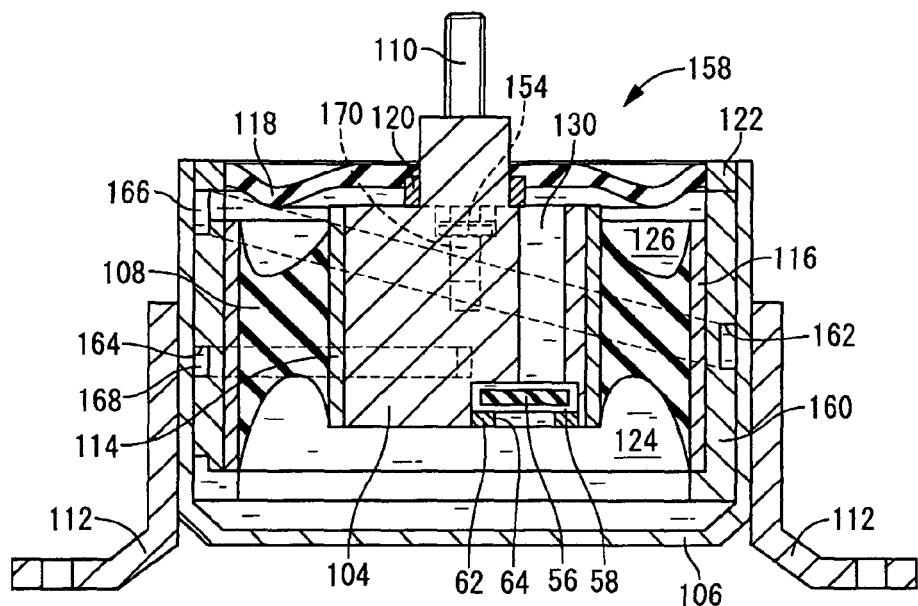
FIG. 13 is a vertical cross sectional view of an automotive engine mount according to a seventh embodiment of the present invention.
Figure 14:
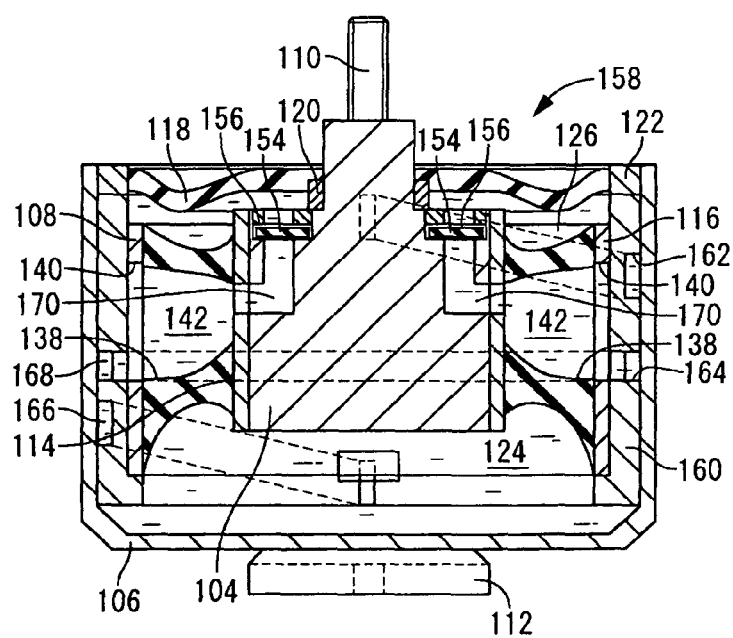
FIG. 14 is another vertical cross sectional view of the engine mount.
Figure 15:
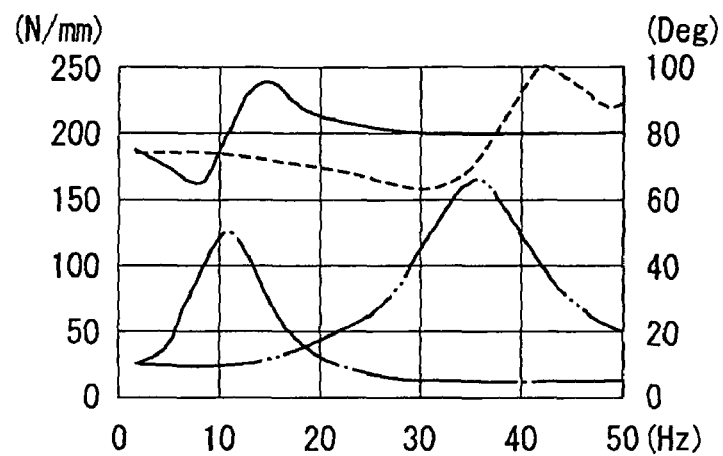
FIG. 15 is a graph showing vibration damping characteristics of the engine mount in the axial direction.
Figure 16:
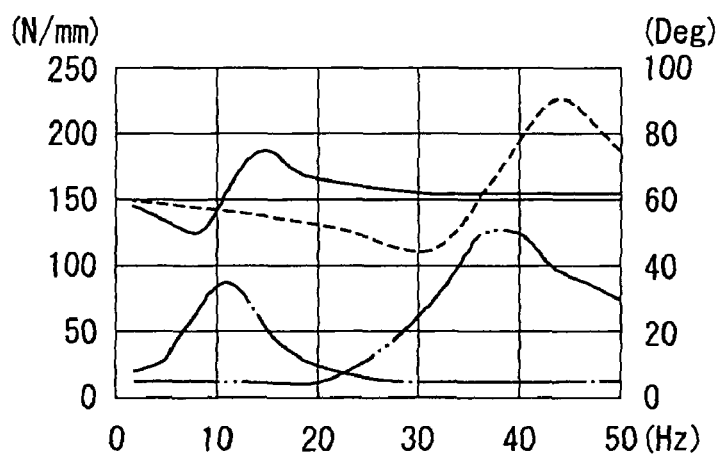
FIG. 16 is a graph showing vibration damping characteristics of the engine mount in the axis-perpendicular direction.

Next, FIGS. 13 and 14 depict an automotive engine mount 158 described as a seventh embodiment of the fluid-filled type vibration damping device constructed according to the present invention. In this engine mount 158, an orifice fitting 160 has been interposed diametrically between the second mounting member 106 and the outside peripheral mating attachment fitting 116.

The orifice fitting 160 has approximately circular cylinder shape with a first circumferential groove 162 and a second circumferential groove 164 opening onto its outside peripheral face. The first circumferential groove 162 takes the form of a helical slot extending in the circumferential direction for a length approximately equal to once around the circumference, while sloping in the axial direction. The second circumferential groove 164 on the other hand takes the form of a slot extending in the circumferential direction for a length approximately equal to halfway around the circumference and without sloping; it is formed in a zone of the axially medial section of the orifice fitting 160 situated away from the first circumferential groove 162.

By pressure-fitting the orifice fitting 160 into the inside peripheral side of the second mounting member 106, the openings of the pair of pocket portions 138, 138 will be covered by the orifice fitting 160, forming a pair of fluid chambers 142, 142 which are situated in opposition along an axis lying in the axis-perpendicular direction. The outside peripheral openings of the first and second circumferential grooves 162, 164 are covered by the second mounting member 106. One end of the first circumferential groove 162 connects to the pressure-receiving chamber 124, while the other end connects to the equilibrium chamber 126, thereby defining a low-frequency orifice passage 166 that connects the pressure-receiving chamber 124 and the equilibrium chamber 126 to one another. Meanwhile, the two ends of the second circumferential groove 164 connect to the pair of fluid chambers 142, 142, thereby defining a first connecting passage 168 connecting these fluid chambers 142, 142 to one another. The low-frequency orifice passage 166 and the first connecting passage 168 are both tuned to low frequency of about 10 Hz.

Here, a pair of second connecting passages 170, 170 have been formed in the first mounting member 104. In more detail, the second connecting passages 170 are formed utilizing circular holes that pass completely through the first mounting member 104. Each circular hole opens at one end onto the upper end face of the first mounting member 104 and connects with the equilibrium chamber 126, while the other end opens onto the outside peripheral face of the first mounting member 104 and connects to one of the fluid chambers 142 through a communication hole that has been formed in the inside peripheral mating attachment fitting 114. The second connecting passages 170 that connect the fluid chambers 142 to the equilibrium chamber 126 are defined thereby; in the present embodiment, the pair of second connecting passages 170, 170 respectively connecting the pair of fluid chambers 142, 142 to the equilibrium chamber 126 have been formed independently of one another. The second connecting passages 170 are tuned to higher frequency than the first connecting passage 168.

Additionally, a second moveable member 154 has been disposed on the fluid channel of each of the second connecting passages 170. The second moveable member 154 is formed by a rubber elastic body of circular disk shape, and is accommodated within a second housing space 156 that has been provided at the end of the second connecting passage 170 on the equilibrium chamber 126 side. The second moveable member 154 is oriented so as to extend in the approximately orthogonal direction with respect to the lengthwise direction of the second connecting passage 170, and so as to allow minute displacement in the plate thickness direction, which is also the lengthwise direction of the second connecting passage 170. At times of input of small-amplitude vibration, fluid flow will arise through the second connecting passage 170 because of minute displacement of the second moveable member 154, whereas at times of input of large-amplitude vibration, the second moveable member 154 will be constrained by the wall of the second housing space 156 so that the second connecting passage 170 becomes blocked.

In the engine mount 158 constructed according to the present embodiment, in response to input of vibration in the axial direction, vibration damping action will be produced by the low-frequency orifice passage 166 and the high-frequency orifice passage 130, which have been tuned to mutually different frequencies; while in response to input of vibration in the axis-perpendicular direction, vibration damping action will be produced by the first and second connecting passages 168, 170, which have been tuned to mutually different frequencies.

Accordingly, in the present embodiment, the low-frequency orifice passage 166 and the first connecting passage 168 which are tuned to low frequency have been formed extending the circumferential direction in the orifice fitting 160, which is larger in diameter than the first mounting member 104. Thus, ample passage length of the low-frequency orifice passage 166 and the first connecting passage 168 can be efficiently assured so that the passages 166, 168 can be tuned to the desired low frequency.

In the present embodiment, the second connecting passages 170 do not connect the pair of fluid chambers 142, 142 to one another, but are instead formed so as to connect the fluid chambers 142 with the equilibrium chamber 126, which has lower wall spring rigidity. For this reason, low dynamic spring resulting from fluid flow through the second connecting passages 170 can be attained more advantageously at times of input of high-frequency, small-amplitude vibration.

While the present invention has been described hereinabove through certain preferred embodiments, these are merely exemplary, and the invention should not be construed as limited in any manner by the specific disclosure of the embodiments herein.

For example, in the preceding first to third embodiments the low-frequency orifice passage 52 has been formed extending in the circumferential direction to the outside peripheral side of the cylindrical portion 21 of the second mounting member 14, but it is not essential to employ a construction in which the low-frequency orifice passage extends along the cylindrical portion 21 of the second mounting member 14. Specifically, in another possible arrangement depicted in FIG. 8 for example, the high-frequency orifice passage is formed extending through the interior of the first mounting member, while the low-frequency orifice passage is formed extending in the circumferential direction at the outside peripheral edge part of the first mounting member. With this arrangement, the low-frequency orifice passage and the high-frequency orifice passage can be formed with good space efficiency, making it possible to more effectively achieve an engine mount of compact size. Also, where a medial support portion like that shown in the preceding second embodiment is employed, the low-frequency orifice passage could be formed in the medial support portion.

Nor is it essential that the low-frequency orifice passage and the high-frequency orifice passage be formed completely independently; these could instead be constituted in part by a common fluid channel. Also, an arrangement whereby the low-frequency orifice passage is formed away from the placement location of the moveable member on the fluid channel of the high-frequency orifice passage and, for example, the end of the low-frequency orifice passage on the equilibrium chamber side thereof is constituted by a portion of the high-frequency orifice passage lying further towards the equilibrium chamber side from the moveable member.

Also, whereas in the preceding first to third embodiments, a first moveable member 56, 92 permitted to undergo minute displacement in the axial direction has been shown by way the first moveable member, as depicted in FIG. 4 for, example, a moveable film composed of a rubber film supported fixedly at its outside peripheral edge part by the first support member could instead be employed as the first moveable member, with the rubber film oriented approximately orthogonal to the lengthwise direction of the high-frequency orifice passage so as to limit the level of fluid flow through the high-frequency orifice passage, and adapted to transmit liquid pressure through elastic deformation. In the fourth embodiment depicted in FIG. 4, a moveable plate could be employed in place of the first moveable member 132. Where a moveable plate has been employed as the first moveable member, the moveable plate may be rigid, in which case striking noise produced at times of contact may be reduced to a sufficient extent by situating it on the power unit side. As with the first moveable member, either a moveable plate or a moveable film may be employed as the second moveable member.

Also, while in the preceding second embodiment the main rubber elastic body 16 has been bifurcated into an inside peripheral side and an outside peripheral side by the medial support member 70, it is not essential for the medial support member to be constructed so that it divides the main rubber elastic body, and it could instead be juxtaposed against and anchored to the base wall of the large-diameter recess of the main rubber elastic body.

Moreover, there may also be provided for example a liquid pressure absorbing mechanism adapted to produce vibration damping action (low dynamic spring) based on liquid pressure absorbing action through escape of pressure from the pressure-receiving chamber to the equilibrium chamber at times of input of vibration of higher frequency than the tuning frequency of the high-frequency orifice passage corresponding to driving rumble or the like. The tuning of the low-frequency orifice passage, the high-frequency orifice passage, and the liquid pressure absorbing mechanism may be modified appropriately according to the frequency of the vibrations being damped.

Further, whereas in the fourth to seventh embodiments in which fluid chambers are provided, in each case a pair of fluid chambers 142, 142 have been formed in opposition along an axis lying in the axis-perpendicular direction, it is not essential for the fluid chambers to be provided in pairs, and there could instead be three or more. In this case, at least two of the fluid chambers will be situated to either side in the axis-perpendicular direction with the first mounting member between, but it is not essential for them to actually face one another in the axis-perpendicular direction with the first mounting member between; the fluid chambers could instead be biased to one side. Additionally, in the construction described in the preceding seventh embodiment, in which the fluid chambers and the equilibrium chamber are connected, a single fluid chamber could suffice, in which case a single connecting passage would suffice, and the first connecting passage could be dispensed with.

In the preceding seventh embodiment, the first connecting passage 168 which connects the pair of fluid chambers 142, 142 and the second connecting passage 170 which connects the equilibrium chamber 126 with the fluid chambers 142 have been formed mutually independently, but for example, a first connecting passage that passes through the first mounting member 104 in the axis-perpendicular direction and connects the pair of fluid chambers 142, 142 could be formed by utilizing the end of the second connecting passage 170 on the fluid chamber 142 side thereof. That is, it is not essential for the first connecting passage and the second connecting passage to be formed independently of one another, and a partially shared construction would be acceptable also.

Also, whereas in the first to seventh embodiments hereinabove, a power unit is described by way of example of a primary vibration system, the primary vibration system could be any vibration source for a transmitted vibration-receiving side (vehicle body side), for example, a differential (diff), transmission, or suspension. That is, the fluid-filled type vibration damping device according to the present invention is adaptable not only to an engine mount, but to various other applications such as diff mounts, subframe mounts, and the like. Nor is the invention limited exclusively to application in an automotive fluid-filled type vibration damping device, and has potential application in fluid-filled type vibration damping devices for rolling stock or the like.

It is also to be understood that the present invention may be embodied with various other changes, modifications and improvements, which may occur to those skilled in the art, without departing from the spirit and scope of the invention defined in the following claims.

KEY TO SYMBOLS

10, 66, 98, 102, 146, 150, 158: engine mount (fluid-filled type vibration damping device); 12, 68, 104: first mounting member; 14, 106: second mounting member; 16, 108: main rubber elastic body; 21: cylindrical portion; 26: cover member; 36, 118: flexible film; 44, 88, 124: pressure-receiving chamber; 46, 126: equilibrium chamber; 52, 128, 166: low-frequency orifice passage; 54, 130: high-frequency orifice passage; 56, 92: first moveable member; 70: medial support member; 86: middle chamber; 116: outside peripheral mating attachment fitting; 132: first moveable member; 142: fluid chambers; 144, 168: low-frequency first connecting passage; 152: high-frequency first connecting passage; 154: second moveable member; 160: orifice fitting; 170: second connecting passage

The invention claimed is:

1. A fluid-filled type vibration damping device comprising:
a first mounting member secured to a primary vibration system;
a second mounting member secured to a vehicle body and having a cylindrical portion, the first mounting member being positioned spaced apart from a first opening of the cylindrical portion of the second mounting member;
a main rubber elastic body elastically linking the first mounting member and the second mounting member;
a pressure-receiving chamber in which part of a wall is constituted by the main rubber elastic body and filled with a non-compressible fluid;
a flexible film being arranged so as to cover an outside of the main rubber elastic body, forming an equilibrium chamber filled with the non-compressible fluid to an opposite side of the main rubber elastic body from the pressure-receiving chamber;
a low-frequency orifice passage and a high-frequency orifice passage which are tuned to mutually different frequency ranges are formed to connect the pressure-receiving chamber and the equilibrium chamber;
a cover member closing off another opening of the cylindrical portion of the second mounting member to form the pressure-receiving chamber between opposing faces of the cover member and the main rubber elastic body;
a first moveable member that limits a fluid flow amount being disposed on a fluid channel through the high-frequency orifice passage, with the first moveable member being supported by a first support member that is elastically linked to the second mounting member via the main rubber elastic body; and
a fluid channel through the low-frequency orifice passage being situated away from the placement location of the first moveable member;
a medial support member attached to the main rubber elastic body in a medial section of the main rubber elastic body in a direction of linking the first mounting member and the second mounting member such that the medial support member extends so as to encircle an outer perimeter of the first mounting member; and
a middle chamber filled with a non-compressible fluid and formed between the first moveable member and the first mounting member, wherein
the first moveable member is supported by the medial support member,
the pressure-receiving chamber is formed between the first moveable member and the cover member, and
the pressure-receiving chamber and the equilibrium chamber communicate by the high-frequency orifice passage via the middle chamber.

2. The fluid-filled type vibration damping device according to claim 1, wherein
the high-frequency orifice passage is provided in the first mounting member, and the first support member is constituted by the first mounting member.

3. The fluid-filled type vibration damping device according to claim 2, wherein the high-frequency orifice passage is provided as a passage of tunnel form passing through an interior of the first mounting member and communicating at one end with the pressure-receiving chamber while communicating at the other end with the equilibrium chamber, with the first moveable member situated accommodated on the high-frequency orifice passage so as to be oriented orthogonal to a lengthwise direction of the channel.

4. The fluid-filled type vibration damping device according to claim 1, wherein the low-frequency orifice passage is formed by a construction that extends in a circumferential direction along the cylindrical portion of the second mounting member.

5. The fluid-filled type vibration damping device according to claim 1, wherein the device is applied as an engine mount wherein the primary vibration system is a power unit.

6. The fluid-filled type vibration damping device according to claim 1, wherein the high-frequency orifice passage is formed so as to pass through the main rubber elastic body, and one end of the high-frequency orifice passage opens onto an inside peripheral face of the main rubber elastic body to communicate with the middle chamber, while another end of the high-frequency orifice passage opens onto an outside peripheral face of the main rubber elastic body to communicate with the equilibrium chamber.

7. A fluid-filled type vibration damping device comprising:
a first mounting member secured to a primary vibration system;
a second mounting member secured to a vehicle body and having a cylindrical portion, the first mounting member being positioned spaced apart from a first opening of the cylindrical portion of the second mounting member;
a main rubber elastic body elastically linking the first mounting member and the second mounting member;
a pressure-receiving chamber in which part of a wall is constituted by the main rubber elastic body and filled with a non-compressible fluid;
a flexible film being arranged so as to cover an outside of the main rubber elastic body, forming an equilibrium chamber filled with the non-compressible fluid to an opposite side of the main rubber elastic body from the pressure-receiving chamber;
a low-frequency orifice passage and a high-frequency orifice passage which are tuned to mutually different frequency ranges are formed to connect the pressure-receiving chamber and the equilibrium chamber;
a cover member closing off another opening of the cylindrical portion of the second mounting member to form the pressure-receiving chamber between opposing faces of the cover member and the main rubber elastic body;
a first moveable member that limits a fluid flow amount being disposed on a fluid channel through the high-frequency orifice passage, with the first moveable member being supported by a first support member that is elastically linked to the second mounting member via the main rubber elastic body; and
a fluid channel through the low-frequency orifice passage being situated away from the placement location of the first moveable member,
wherein at least a portion of the first mounting member is constituted as an insertion portion to be inserted into the cylindrical portion of the second mounting member, with the insertion portion of the first mounting member and the cylindrical portion of the second mounting member being linked by the main rubber elastic body; a plurality of fluid chambers are formed in the main rubber elastic body at both sides of the insertion portion of the first mounting member in an axis-perpendicular direction of the cylindrical portion; and a first connecting passage is formed connecting these fluid chambers to one another.

8. The fluid-filled type vibration damping device according to claim 7, wherein the insertion portion of the first mounting member has large-diameter circular post shape; two axial direction through-holes of mutually different diameter are provided passing in an axial direction through the insertion portion, with the small-diameter axial direction through-hole constituting the low-frequency orifice passage and the large-diameter axial direction through-hole constituting the high-frequency orifice passage; and an additional axis-perpendicular direction through-hole is provided passing through the insertion portion in the axis-perpendicular direction in a zone thereof away from the two axial direction through-holes, with the axis-perpendicular direction through-hole constituting the first connecting passage.

9. The fluid-filled type vibration damping device according to claim 7, wherein the insertion portion of the first mounting member has large-diameter circular post shape; the low-frequency orifice passage is constituted by a tunnel-like passage that extends in the circumferential direction while the outside peripheral section of the insertion portion slopes in the axial direction; the high-frequency orifice passage is constituted by an axial direction through-hole passing in the axial direction through the insertion portion; and the first connecting passage is constituted by an axis-perpendicular direction through-hole passing through the insertion portion in the axis-perpendicular direction in a zone thereof away from these orifice passages.

10. The fluid-filled type vibration damping device according to claim 7, wherein the first connecting passage includes a low-frequency first connecting passage and a high-frequency first connecting passage that is tuned to a higher frequency range than the low-frequency first connecting passage; a second moveable member that limits the fluid flow amount through the high-frequency first connecting passage is disposed on a fluid channel of the high-frequency first connecting passage; and the second moveable member is supported by a second support member that is elastically linked to the second mounting member by the main rubber elastic body.

11. The fluid-filled type vibration damping device according to claim 7, wherein the first connecting passage includes a low-frequency first connecting passage and a high-frequency first connecting passage that is tuned to a higher frequency range than the low-frequency first connecting passage; a second moveable member that limits the fluid flow amount through a high-frequency first connecting passage is disposed on the fluid channel of the high-frequency first connecting passage; the second moveable member is supported by a second support member that is elastically linked to the second mounting member by the main rubber elastic body; the insertion portion of the first mounting member has large-diameter circular post shape with two axial direction through-holes of mutually different diameter provided passing in the axial direction through the insertion portion, the small-diameter axial direction through-hole constituting the low-frequency orifice passage and the large-diameter axial direction through-hole constituting the high-frequency orifice passage; two axis-perpendicular direction through-holes of mutually different diameter are provided passing through the insertion portion in the axis-perpendicular direction in a zone thereof away from the two axial direction through-holes, with the small-diameter axis-perpendicular direction through-hole constituting a low-frequency first connecting passage, and the large-diameter axis-perpendicular direction through-hole constituting a high-frequency first connecting passage.

12. The fluid-filled type vibration damping device according to claim 8, wherein the first connecting passage is formed in a zone away from the low-frequency orifice passage and the high-frequency orifice passage in the first mounting member.

13. The fluid-filled type vibration damping device according to claim 7, wherein the fluid chambers are respectively connected to the equilibrium chamber by the second connecting passage; and the first connecting passage is formed connecting the plurality of fluid chambers to one another.

14. The fluid-filled type vibration damping device according to claim 13, wherein an orifice fitting is attached fitting diametrically between the second mounting member and an outside peripheral mating attachment fitting that has been vulcanization bonded to the outside peripheral face of the main rubber elastic body; the orifice fitting is furnished with a first circumferential groove that opens onto the outside peripheral face thereof and that extends in a helical pattern in the circumferential direction while sloping in the axial direction to connect the pressure-receiving chamber and the equilibrium chamber, and a second circumferential groove that extends in the circumferential direction for a length approximately half the circumference and connects a pair of fluid chambers; the openings of the first and second circumferential grooves are covered by the second mounting member, whereby the low-frequency orifice passage is constituted by the first circumferential groove and the first connecting passage is constituted by the second circumferential groove; the insertion portion of the first mounting member has large-diameter circular post shape; the high-frequency orifice passage is constituted by an axial direction through-hole that passes in the axial direction through the insertion portion; and a pair of the second connecting passages are constituted by a pair of through-holes that pass through the insertion portion in a zone away from the high-frequency orifice passage and that respectively connect the pair of fluid chambers with the equilibrium chamber.

15. The fluid-filled type vibration damping device according to claim 14, wherein the second connecting passage is formed in a zone of the first mounting member away from the low-frequency orifice passage and the high-frequency orifice passage.

16. The fluid-filled type vibration damping device according to claim 7, wherein the device is applied as an engine mount wherein the primary vibration system is a power unit.

* * * * *